US012764751B2

(12) United States Patent
Maamari et al.

(10) Patent No.: US 12,764,751 B2
(45) Date of Patent: Oct. 13, 2026

(54) RECLAIMING UNUSED UPLINK OCCASIONS

(71) Applicant: QUALCOMM Incorporated, San Diego, CA (US)

(72) Inventors: Diana Maamari, San Diego, CA (US); Ahmed Elshafie, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 18/507,525

(22) Filed: Nov. 13, 2023

(65) Prior Publication Data

US 2024/0267924 A1 Aug. 8, 2024

Related U.S. Application Data

(60) Provisional application No. 63/483,844, filed on Feb. 8, 2023.

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC ............. H04W 72/23; H04W 72/0446; H04W 72/1268
See application file for complete search history.

(56) References Cited

U.S. PATENT DOCUMENTS

| | | | | |
|---|---|---|---|---|
| 2017/0026985 | A1* | 1/2017 | Lindoff | H04W 72/1215 |
| 2023/0239703 | A1* | 7/2023 | Rosa | H04L 5/0032 370/328 |
| 2023/0397216 | A1* | 12/2023 | Kang | H04W 72/1268 |
| 2024/0155573 | A1* | 5/2024 | Yang | H04W 72/115 |

* cited by examiner

*Primary Examiner* — Ayanah S George
(74) *Attorney, Agent, or Firm* — Shankar Krithivasan

(57) ABSTRACT

Various aspects of the present disclosure generally relate to wireless communication. In some aspects, a user equipment (UE) may receive configuration information indicating one or more uplink occasions. The UE may transmit an indication of one or more unused uplink occasions of the one or more uplink occasions. The UE may transmit an uplink communication using resources associated with at least one unused uplink occasion of the one or more unused uplink occasions. Numerous other aspects are described.

30 Claims, 12 Drawing Sheets

600

RECLAIMING UNUSED UPLINK OCCASIONS

CROSS-REFERENCE TO RELATED APPLICATION

This Patent Application claims priority to U.S. Provisional Patent Application No. 63/483,844, filed on Feb. 8, 2023, entitled "RECLAIMING UNUSED UPLINK OCCASIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for reclaiming unused uplink occasions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some examples, a user equipment (UE) may be configured or scheduled with uplink occasions, such as periodic or semi-persistent occasions (e.g., referred to herein as "periodic uplink occasions") or other uplink occasions. An occasion may be associated with a resource allocation (e.g., in a time domain, frequency domain, spatial domain, and/or code domain) and a periodicity at which the resource allocation repeats over time. For example, a network node may transmit, and a UE may receive, a configured grant (CG) configuration. For example, the network node may transmit configuration information that identifies a CG period associated with multiple CG (or physical uplink shared channel (PUSCH)) occasions. For example, the UE may be configured with a CG period that includes multiple CG occasions and/or PUSCH occasions (e.g., multiple uplink occasions).

In some cases, the UE may transmit, and the network node may receive, an indication of one or more unused CG occasions associated with a given CG period. An unused occasion may not be an occasion that is actually unused, but rather an occasion that is indicated (by the UE) as being skipped or unused by the UE (e.g., an being intended to be skipped or unused by the UE). However, in some cases, uplink traffic (e.g., data) may arrive at the UE after the UE transmits the indication of the one or more unused CG occasions (e.g., and before a next CG period). Because the UE has already transmitted the indication of the one or more unused CG occasions, the UE may be unable to use the one or more unused CG occasions to transmit the uplink traffic. Therefore, the UE may have to wait until a next CG period and/or a next available CG occasion to transmit the uplink traffic. This may increase latency associated with the uplink traffic. In some cases, the uplink traffic may be associated with strict latency requirements and/or small packet delay budgets (PDBs). As a result, increasing the latency associated with the uplink traffic may cause a quality of service (QoS) of the uplink traffic not being met, may cause the uplink traffic to be dropped or discarded (e.g., due to an expiration of the PDB), and/or may cause a loss of information associated with the uplink traffic, among other examples. This negatively impacts the performance of the uplink traffic.

Some techniques and apparatuses described herein enable the reclaiming of unused uplink occasions (e.g., unused CG occasions or unused PUSCH occasions). In some aspects, a UE may be enabled to transmit an uplink communication using resources (e.g., time domain resources, frequency domain resources, spatial domain resources (e.g., a beam), and/or code domain resources) associated with an uplink occasion (e.g., a CG occasion or a PUSCH occasion) that was indicated (e.g., by the UE) as being unused or skipped by the UE. As used herein, "reclaiming" an occasion (e.g., an unused occasion) may refer to the UE transmitting an uplink communication using resources associated with an occasion that was previously indicated as being unused or skipped by the UE.

Some aspects described herein relate to a user equipment (UE) for wireless communication. The UE may include one or more memories and one or more processors coupled to the one or more memories. The one or more processors may be configured to receive configuration information indicating one or more uplink occasions. The one or more processors may be configured to transmit an indication of one or more unused uplink occasions of the one or more uplink occasions. The one or more processors may be configured to transmit an uplink communication using resources associated with at least one unused uplink occasion of the one or more unused uplink occasions.

Some aspects described herein relate to a network node for wireless communication. The network node may include one or more memories and one or more processors coupled to the one or more memories. The one or more processors may be configured to transmit configuration information, for a UE, indicating one or more uplink occasions. The one or more processors may be configured to receive an indication of one or more unused uplink occasions, of the one or more uplink occasions, associated with the UE. The one or more processors may be configured to receive an uplink communication, associated with the UE, using resources associated with at least one unused uplink occasion of the one or more unused uplink occasions.

Some aspects described herein relate to a method of wireless communication performed by a UE. The method may include receiving configuration information indicating one or more uplink occasions. The method may include transmitting an indication of one or more unused uplink occasions of the one or more uplink occasions. The method may include transmitting an uplink communication using resources associated with at least one unused uplink occasion of the one or more unused uplink occasions.

Some aspects described herein relate to a method of wireless communication performed by a network node. The method may include transmitting configuration information, for a UE, indicating one or more uplink occasions. The method may include receiving an indication of one or more unused uplink occasions, of the one or more uplink occasions, associated with the UE. The method may include receiving an uplink communication, associated with the UE, using resources associated with at least one unused uplink occasion of the one or more unused uplink occasions.

Some aspects described herein relate to a non-transitory computer-readable medium that stores a set of instructions for wireless communication by a UE. The set of instructions, when executed by one or more processors of the UE, may cause the UE to receive configuration information indicating one or more uplink occasions. The set of instructions, when executed by one or more processors of the UE, may cause the UE to transmit an indication of one or more unused uplink occasions of the one or more uplink occasions. The set of instructions, when executed by one or more processors of the UE, may cause the UE to transmit an uplink communication using resources associated with at least one unused uplink occasion of the one or more unused uplink occasions.

Some aspects described herein relate to a non-transitory computer-readable medium that stores a set of instructions for wireless communication by a network node. The set of instructions, when executed by one or more processors of the network node, may cause the network node to transmit configuration information, for a UE, indicating one or more uplink occasions. The set of instructions, when executed by one or more processors of the network node, may cause the network node to receive an indication of one or more unused uplink occasions, of the one or more uplink occasions, associated with the UE. The set of instructions, when executed by one or more processors of the network node, may cause the network node to receive an uplink communication, associated with the UE, using resources associated with at least one unused uplink occasion of the one or more unused uplink occasions.

Some aspects described herein relate to an apparatus for wireless communication. The apparatus may include means for receiving configuration information indicating one or more uplink occasions. The apparatus may include means for transmitting an indication of one or more unused uplink occasions of the one or more uplink occasions. The apparatus may include means for transmitting an uplink communication using resources associated with at least one unused uplink occasion of the one or more unused uplink occasions.

Some aspects described herein relate to an apparatus for wireless communication. The apparatus may include means for transmitting configuration information, for a UE, indicating one or more uplink occasions. The apparatus may include means for receiving an indication of one or more unused uplink occasions, of the one or more uplink occasions, associated with the UE. The apparatus may include means for receiving an uplink communication, associated with the UE, using resources associated with at least one unused uplink occasion of the one or more unused uplink occasions.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
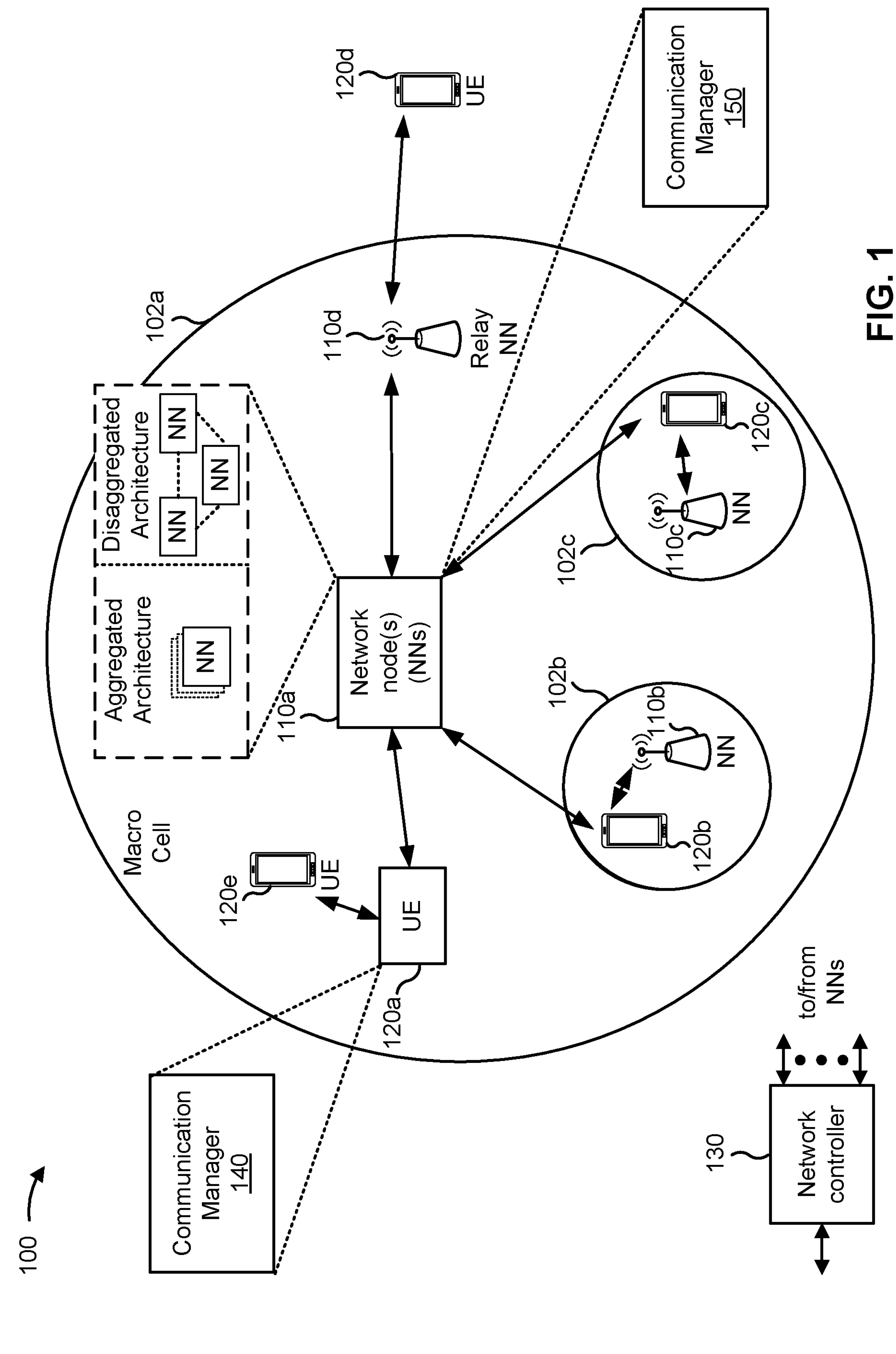
FIG. 1 is a diagram illustrating an example of a wireless network, in accordance with the present disclosure.

Aspects of the present disclosure provide apparatuses, devices, methods, processing systems, and computer-readable mediums for reclaiming unused uplink occasions.

In some examples, a user equipment (UE) may be configured or scheduled with uplink occasions, such as periodic or semi-persistent occasions (e.g., referred to herein as "periodic uplink occasions") or other uplink occasions. An occasion may be associated with a resource allocation (e.g., in a time domain, frequency domain, spatial domain, and/or code domain) and a periodicity at which the resource allocation repeats over time. For example, a network node may transmit, and a UE may receive, a configured grant (CG) configuration. For example, the network node may transmit configuration information that identifies a CG period associated with multiple CG (or physical uplink shared channel (PUSCH)) occasions. For example, the UE may be configured with a CG period that includes multiple CG occasions and/or PUSCH occasions (e.g., multiple uplink occasions).

In some cases, the UE may transmit, and the network node may receive, an indication of one or more unused CG occasions associated with a given CG period. As used herein, an "unused" occasion (e.g., an unused CG occasion, an unused PUSCH occasion, and/or an unused uplink occasion) may refer to an occasion that is configured for the UE (e.g., via a CG configuration or other configuration) and that is indicated as not to be used for an uplink communication by the UE (e.g., via signaling between the UE and the network node). An unused occasion may also be referred to as a skipped occasion. In other words, an unused occasion may not be an occasion that is actually unused, but rather an occasion that is indicated (by the UE) as being skipped or unused by the UE (e.g., an being intended to be skipped or unused by the UE).

However, in some cases, uplink traffic (e.g., data) may arrive at the UE after the UE transmits the indication of the one or more unused CG occasions (e.g., and before a next CG period). Because the UE has already transmitted the indication of the one or more unused CG occasions, the UE may be unable to use the one or more unused CG occasions to transmit the uplink traffic. Therefore, the UE may have to wait until a next CG period and/or a next available CG occasion to transmit the uplink traffic. This may increase latency associated with the uplink traffic. In some cases, the uplink traffic may be associated with strict latency requirements and/or small packet delay budgets (PDBs). As a result, increasing the latency associated with the uplink traffic may cause a quality of service (QoS) of the uplink traffic not being met, may cause the uplink traffic to be dropped or discarded (e.g., due to an expiration of the PDB), and/or may cause a loss of information associated with the uplink traffic, among other examples. This negatively impacts the performance of the uplink traffic.

Some techniques and apparatuses described herein enable the reclaiming of unused uplink occasions (e.g., unused CG occasions or unused PUSCH occasions). In some aspects, a UE may be enabled to transmit an uplink communication using resources (e.g., time domain resources, frequency domain resources, spatial domain resources (e.g., a beam), and/or code domain resources) associated with an uplink occasion (e.g., a CG occasion or a PUSCH occasion) that was indicated (e.g., by the UE) as being unused or skipped by the UE. As used herein, "reclaiming" an occasion (e.g., an unused occasion) may refer to the UE transmitting an uplink communication using resources associated with an occasion that was previously indicated as being unused or skipped by the UE.

Enabling the UE to reclaim an unused uplink occasion (e.g., an unused CG occasion or an unused PUSCH occasion) reduces latency associated with traffic that arrives at the UE (e.g., at a buffer of the UE) after the UE transmits an indication of one or more unused uplink occasion (e.g., including the unused uplink occasion). Reducing the latency associated with the uplink traffic enables the UE to ensure QoS requirements of the uplink traffic are met, ensures that the uplink traffic is not dropped or discarded (e.g., due to an expiration of the PDB), and/or reduces a risk of a loss of information associated with the uplink traffic, among other examples. Therefore, a performance of the uplink traffic is improved by enabling the UE to reclaim an unused uplink occasion to transmit the uplink traffic.

In some aspects, the UE transmitting an uplink communication using resources associated with an unused uplink occasion may be based on, or otherwise associated with, one or more parameters of the uplink communication. In other words, the UE may be enabled to reclaim an unused occasion or a skipped occasion subject to one or more parameters or metrics satisfying criteria for reclaiming unused occasion or a skipped occasion. The one or more parameters may include a logical channel associated with the uplink communication, a logical channel group (LCG) associated with the uplink communication, a PDB associated with the uplink communication, and/or a remaining PDB associated with uplink communication, among other examples. Limiting the reclaiming of an unused uplink occasion by the UE to scenarios where certain criteria are met may ensure that the UE only reclaims the unused uplink occasion for appropriate uplink traffic (e.g., for uplink traffic associated with strict latency requirements and/or a small remaining PDB). This reduces a complexity and/or conserves resources that would have otherwise been used associated the UE reclaiming an unused uplink occasion and transmitting an uplink communication using the unused uplink occasion for traffic that could otherwise wait to be transmitted in a next CG period or a next available CG occasion.

In some aspects, the UE may transmit a communication (e.g., a scheduling request of another communication) indicating that one or more unused uplink occasion is to be reclaimed. This enables a network node to identify which uplink occasions, from one or more unused uplink occasions, are to be reclaimed by the UE. This reduces a complexity and/or conserves resources that would have otherwise been associated with the network node performing a blind detection and/or decoding of the one or more unused uplink occasions to identify which uplink occasions have been reclaimed by the UE. In some aspects, a configuration (e.g., a CG configuration) may indicate that one or more uplink occasions are associated with a first one or more values for one or more respective communication parameters, and the uplink communication that is transmitted via a reclaimed unused uplink occasion may be associated with a second one or more values for the one or more respective communication parameters. In other words, a use of reclaimed unused uplink occasions may be restricted or reduces, such as by using less resources (e.g., less resource blocks (RBs)), a lower transmit power, a lower modulation and coding scheme (MCS) (e.g., an MCS associated with a lower index value), and/or a reduced resource pool, among other examples, as compared to the configuration of the uplink occasions. This mitigates a risk of interference with other UEs that may be communicating using resources associated with unused uplink occasions (e.g., because a network node may reallocate the resources to the other UEs after the UE indicates that the uplink occasions are to be unused or skipped by the UE).

Various aspects of the disclosure are described more fully hereinafter with reference to the accompanying drawings. This disclosure may however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive configuration information indicating one or more uplink occasions; transmit an indication of one or more unused uplink occasions of the one or more uplink occasions; and transmit an uplink communication using resources associated with at least one unused uplink occasion of the one or more unused uplink occasions. Additionally, or alternatively, the communication manager 140 may perform one or more other operations described herein.

In some aspects, the network node 110 may include a communication manager 150. As described in more detail elsewhere herein, the communication manager 150 may transmit configuration information, for a UE (e.g., the UE 120), indicating one or more uplink occasions; receive an indication of one or more unused uplink occasions, of the one or more uplink occasions, associated with the UE; and receive an uplink communication, associated with the UE, using resources associated with at least one unused uplink occasion of the one or more unused uplink occasions. Additionally, or alternatively, the communication manager 150 may perform one or more other operations described herein.

As indicated above, FIG. 1 is provided as an example. Other examples may differ from what is described with regard to FIG. 1.

Figure 2:
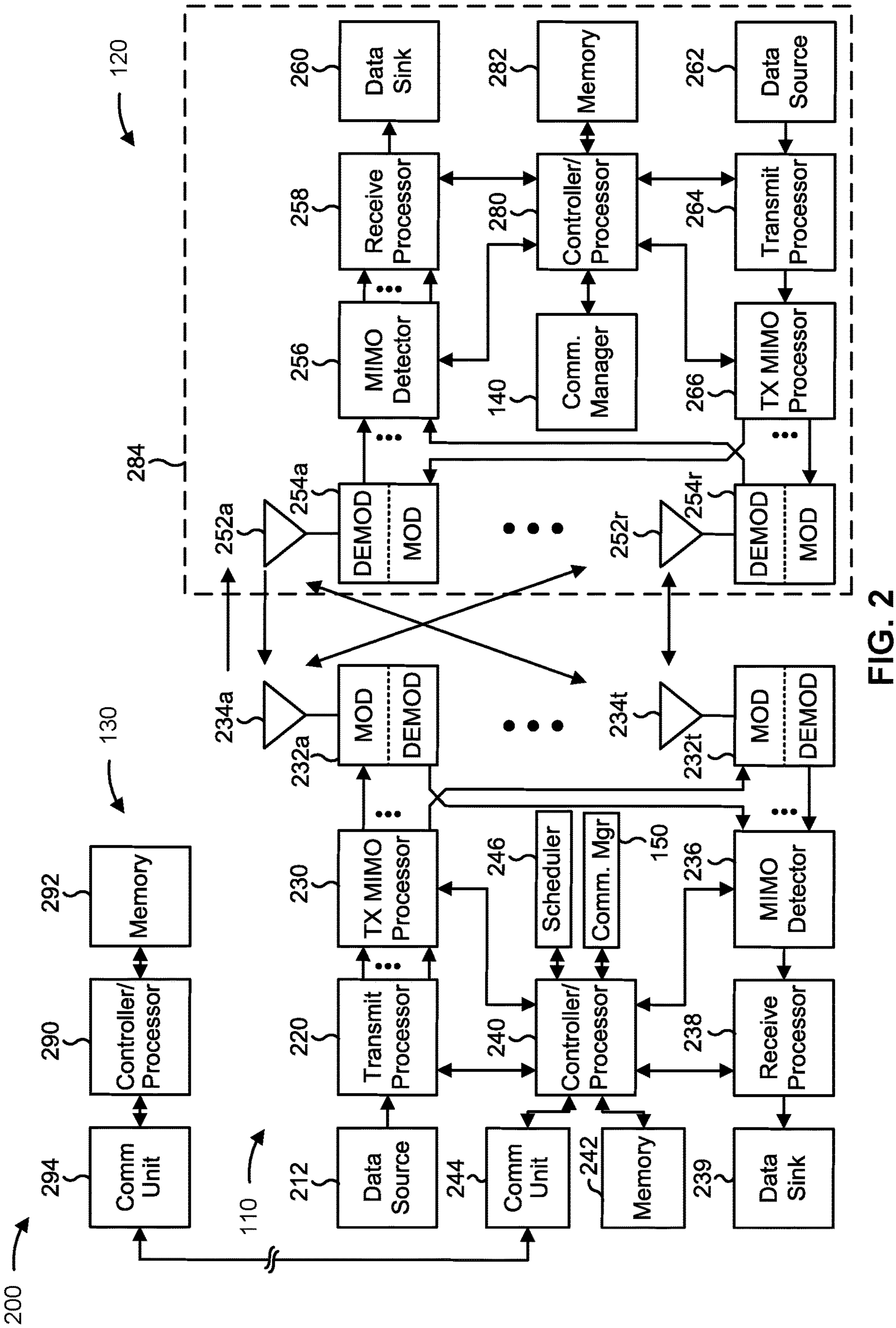
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more MCSs for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term “controller/processor” may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-12).

The controller/processor 240 of the network node 110, the controller/processor 280 of the UE 120, and/or any other component(s) of FIG. 2 may perform one or more techniques associated with reclaiming unused uplink occasions, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving configuration information indicating one or more uplink occasions; means for transmitting an indication of one or more unused uplink occasions of the one or more uplink occasions; and/or means for transmitting an uplink communication using resources associated with at least one unused uplink occasion of the one or more unused uplink occasions. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting configuration information, for a UE, indicating one or more uplink occasions; means for receiving an indication of one or more unused uplink occasions, of the one or more uplink occasions, associated with the UE; and/or means for receiving an uplink communication, associated with the UE, using resources associated with at least one unused uplink occasion of the one or more unused uplink occasions. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

In some aspects, actions described herein as being performed by a network node 110 may be performed by multiple different network nodes. For example, configuration actions may be performed by a first network node (for example, a CU or a DU), and radio communication actions may be performed by a second network node (for example, a DU or an RU).

As used herein, the network node 110 "outputting" or "transmitting" a communication to the UE 120 may refer to a direct transmission (for example, from the network node 110 to the UE 120) or an indirect transmission via one or more other network nodes or devices. For example, if the network node 110 is a DU, an indirect transmission to the UE 120 may include the DU outputting or transmitting a communication to an RU and the RU transmitting the communication to the UE 120, or may include causing the RU to transmit the communication (e.g., triggering transmission of a physical layer reference signal). Similarly, the UE 120 "transmitting" a communication to the network node 110 may refer to a direct transmission (for example, from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU. Similarly, the network node 110 "obtaining" a communication may refer to receiving a transmission carrying the communication directly (for example, from the UE 120 to the network node 110) or receiving the communication (or information derived from reception of the communication) via one or more other network nodes or devices.

Figure 3:
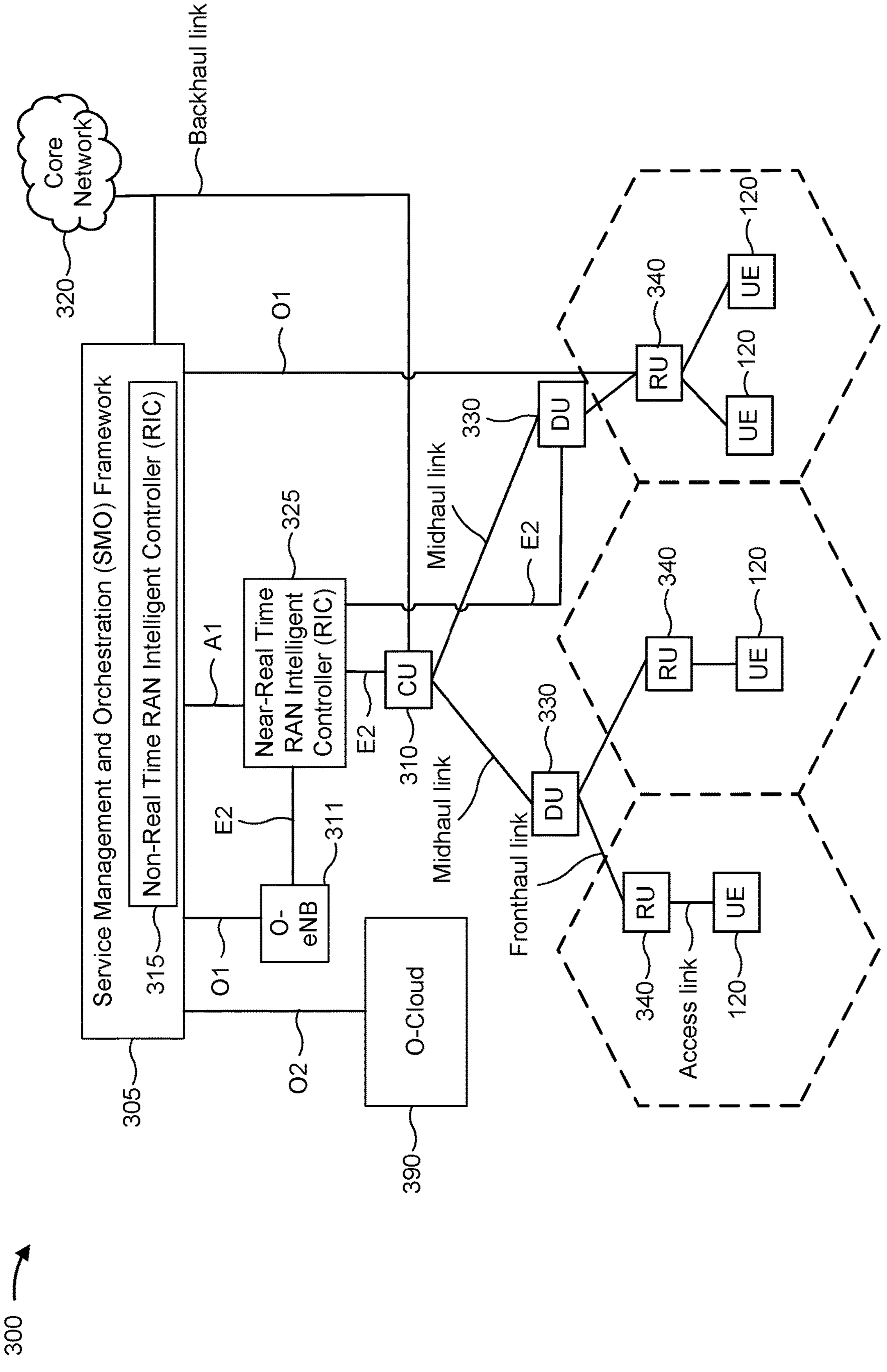
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
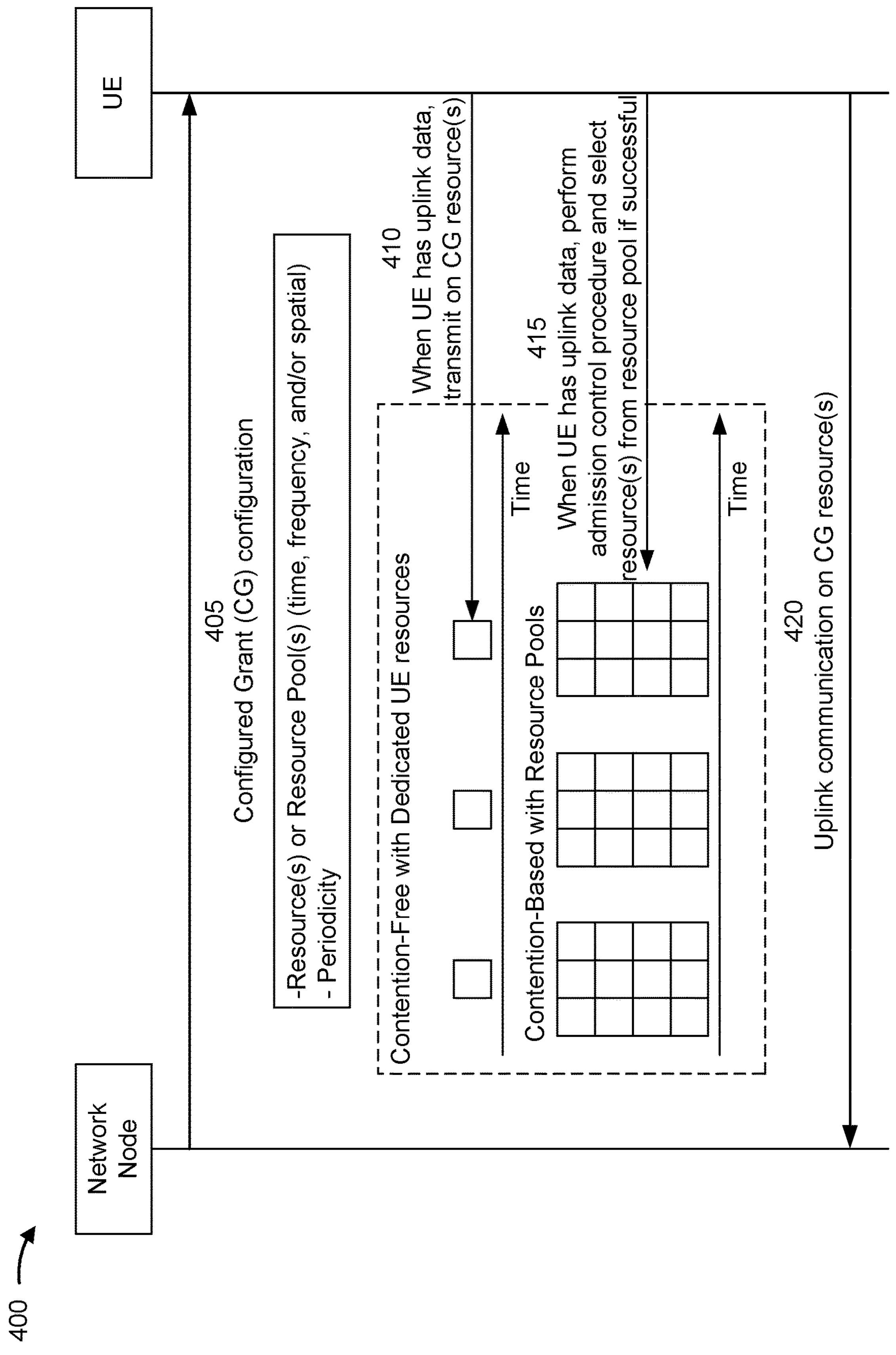
FIG. 4 is a diagram illustrating an example of configured grant (CG) communication, in accordance with the present disclosure.

FIG. 4 is a diagram illustrating an example 400 of CG communication, in accordance with the present disclosure. As shown, example 400 includes a network node and a UE.

As shown in FIG. 4, and by reference number 405, the network node may transmit a CG configuration to the UE. For example, the network node may transmit configuration information (e.g., in an RRC message, in a downlink control information message, and/or in another signaling message) that identifies the CG. In some examples, the configuration information identifying the CG may indicate a resource allocation (e.g., in a time domain, frequency domain, spatial domain, and/or code domain) and/or a periodicity associated with the resource allocation. The resource allocation may be referred to herein as an "occasion" (e.g., a CG occasion or a periodic uplink occasion). "Occasion" and "transmission occasion" may be used interchangeably. For example, an occasion may be associated with the resource allocation that is available for the UE to use for an uplink communication. The CG may identify a resource or set of resources available to the UE for transmission of an uplink communication (e.g., data and/or control information). For example, the CG configuration may identify a resource allocation for a PUSCH (e.g., the resource allocation may be a PUSCH occasion). In some examples, the CG configuration may identify a resource pool or multiple resource pools that may be available to the UE for an uplink transmission.

In some examples, the CG configuration may configure contention-free CG communication with resources dedicated for the UE to transmit uplink communications. In this case, the CG configuration may indicate a resource allocation (e.g., in a time domain, frequency domain, spatial domain, and/or code domain) dedicated for the UE to use to transmit uplink communications. In some examples, the CG configuration may configure the resource allocation for the UE to occur periodically, such that the resource allocation corresponds to periodically occurring transmission time occasions. As shown in FIG. 4, and by reference number 410, when the UE has uplink data to transmit, the UE transmits the uplink data in the CG resources identified by the CG configuration. For example, the UE transmits the uplink data in one of the CG uplink occasions identified in the CG configuration using the configured resource allocation.

In some examples, the CG configuration may configure a period (e.g., a CG period) that is associated with multiple resource allocations and/or multiple CG occasions. In some aspects, the period may be referred to as a CG occasion with multiple PUSCH occasions. For example, a single CG configuration may configure multiple resource allocations and/or multiple CG occasions that are associated with the same CG period. For example, for periodic uplink traffic with variable data burst size, a multiple occasions configured for a period can be useful for a UE. For example, a UE that is relatively stationary (e.g., not moving) may use all or a subset of the occasions configured for the period (e.g., for data transmissions). For example, a period (e.g., a CG period) that is associated with multiple resource allocations and/or multiple CG occasions may be useful for extended reality (XR) applications and/or traffic.

A CG configuration with regular periodic CG uplink occasions with a dedicated resource allocation for the UE may be convenient for a UE with periodic uplink traffic (e.g., with trivial jitter). The CG configuration may configure the periodicity associated with the resource allocation to associate CG uplink occasions with periodic nominal arrival times at which traffic to be transmitted to the network node is expected to arrive at (or be ready to be transmitted by) the UE. However, the actual arrival times at which the traffic arrives (or is ready to be transmitted) by the UE may be different than the nominal arrival times, and this difference in times is known as jitter. In some examples, traffic jittering may be handled by configuring multiple CGs around the nominal arrival times. In some examples, multiple opportunities for the UE to transmit the uplink communication may be defined within a CG uplink occasion. The UE may be configured with multiple CG uplinks to allow the UE to repeatedly transmit the CG uplink communications and increase the likelihood that the network node receives the communications. NR CG uplink may depend on dynamic grant re-transmission. In some examples, to suppress a quantity of dynamic grants, the CG can be configured with blind re-transmissions via multiple repetitions per occasion.

In some cases, CG configurations with dedicated resources allocated per UE may be inefficient. For example, CG configurations with dedicated UE resources for a large number of UEs may result in consumption of an excessive amount of PUSCH resources. In this case, a considerable portion of the PUSCH resources may be inefficiently utilized, which reduces system capacity. For example, when multiple CG configurations for a UE are used for de-jittering, only a subset of CG resources may be effectively utilized. In another example, when multiple transmission opportunities are defined per CG uplink occasion, only one opportunity may be effectively utilized. In yet another example, when a blind repetition scheme is used for re-transmissions, a packet may have been already decoded after the first one or more repetitions (early decoding) such that a remainder of the repetitions are unnecessary. Unlike a downlink case, this type of inefficient consumption of system resources cannot be addressed by scheduling, as the network node does not know exactly when traffic will arrive at the UEs.

CGs may include Type 1 CGs or Type 2 CGs. For Type 1 CGs, a CG configuration (e.g., an RRC configuration) may configure configured uplink grant (including the periodicity). For Type 2 CGs, the CG configuration (e.g., an RRC configuration) may define the periodicity of the configured uplink grant while downlink control information (DCI) can either signal and activate the configured uplink grant. For example, the network node may transmit CG activation DCI to the UE to activate the CG configuration for the UE (e.g., for Type 2 CGs). The network node may indicate, in the CG activation DCI, communication parameters, such as an MCS, an RB allocation, and/or antenna ports, for the CG PUSCH communications to be transmitted in the scheduled CG occasions. The UE may begin transmitting in the CG occasions based at least in part on receiving the CG activation DCI. For example, beginning with a next scheduled CG occasion subsequent to receiving the CG activation DCI, the UE may transmit a PUSCH communication in the scheduled CG occasions using the communication parameters indicated in the CG activation DCI. The UE may refrain from transmitting in configured CG occasions prior to receiving the CG activation DCI.

The network node may transmit CG reactivation DCI to the UE to change the communication parameters for the CG PUSCH communications. Based at least in part on receiving the CG reactivation DCI, and the UE may begin transmitting in the scheduled CG occasions using the communication parameters indicated in the CG reactivation DCI. For example, beginning with a next scheduled CG occasion subsequent to receiving the CG reactivation DCI, the UE may transmit PUSCH communications in the scheduled CG occasions based at least in part on the communication parameters indicated in the CG reactivation DCI.

In some cases, such as when the network node needs to override a scheduled CG communication for a higher priority communication, the network node may transmit CG cancellation DCI to the UE to temporarily cancel or deactivate one or more subsequent CG occasions for the UE. The CG cancellation DCI may deactivate only a subsequent one CG occasion or a subsequent N CG occasions (where N is an integer). CG occasions after the one or more (e.g., N) CG occasions subsequent to the CG cancellation DCI may remain activated. Based at least in part on receiving the CG cancellation DCI, the UE may refrain from transmitting in the one or more (e.g., N) CG occasions subsequent to receiving the CG cancellation DCI. As shown in example 400, the CG cancellation DCI cancels one subsequent CG occasion for the UE. After the CG occasion (or N CG occasions) subsequent to receiving the CG cancellation DCI, the UE may automatically resume transmission in the scheduled CG occasions.

The network node may transmit CG release DCI to the UE to deactivate the CG configuration for the UE. The UE may stop transmitting in the scheduled CG occasions based at least in part on receiving the CG release DCI. For example, the UE may refrain from transmitting in any scheduled CG occasions until another CG activation DCI is received from the network node. Whereas the CG cancellation DCI may deactivate only a subsequent one CG occasion or a subsequent N CG occasions, the CG release DCI deactivates all subsequent CG occasions for a given CG configuration for the UE until the given CG configuration is activated again by a new CG activation DCI.

As shown in FIG. 4, the CG configuration may configure contention-based CG communication with resource pools that are available for multiple UEs to use to transmit uplink communications. The contention-based CG configuration uses statistical multiplexing to share the resource pools among multiple UEs. A resource pool includes multiple resources (e.g., in a time domain, frequency domain, spatial domain, and/or code domain) that can be allocated for uplink transmission for one or more UEs. For example, an horizontal axis of an illustrated resource pool may indicate transmission times and a vertical axis of the illustrated resource pool may indicate resources (e.g., frequency domain, spatial domain, and/or code domain) that can be allocated at each transmission time. In some examples, the same resource pools may be configured for multiple UEs.

As further shown in FIG. 4, and by reference number 415, for the contention-based CG configuration, when the UE has uplink data to be transmitted, the UE performs an admission control procedure and selects one or more resources from the resource pool if the admission control procedure is successful. In some examples, the admission control procedure may include the UE selecting a random number (e.g., between 0 and 1 or some other range), comparing the random number and a threshold, and determining whether the random number satisfies the threshold. If the random number satisfies the threshold, then the admission is successful and the UE selects a resource from the resource pool to transmit the uplink communication.

As further shown in FIG. 4, and by reference number 420, the UE transmits the uplink communication to the network node on the CG resource. For example, the UE may transmit the uplink communication as a PUSCH communication using a resource allocation identified by the CG.

As indicated above, FIG. 4 is provided as an example. Other examples may differ from what is described with respect to FIG. 4.

Figure 5:
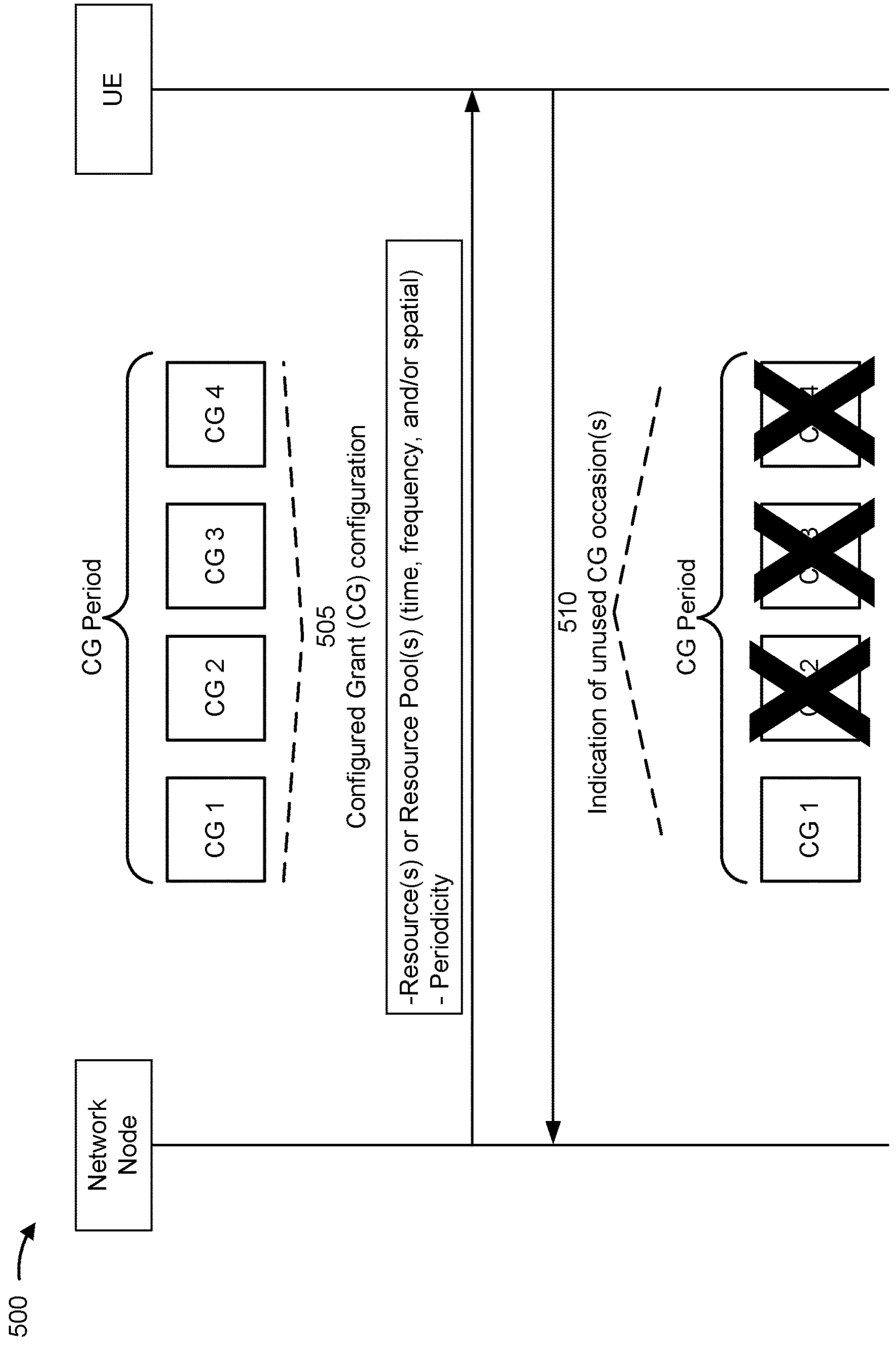
FIG. 5 is a diagram illustrating an example of CG occasion skipping, in accordance with the present disclosure.

FIG. 5 is a diagram illustrating an example 500 of CG occasion skipping, in accordance with the present disclosure. As shown, example 500 includes a network node and a UE.

As shown by reference number 505, the network node may transmit, and the UE may receive, a CG configuration for the UE. For example, the network node may transmit configuration information (e.g., in an RRC communication, in DCI, and/or in another signaling communication) that identifies a CG period associated with multiple CG (or PUSCH) occasions. In some examples, the configuration information identifying the CGs may indicate resource allocations (e.g., in a time domain, frequency domain, spatial domain, and/or code domain) associated with respective CG occasions or PUSCH occasions and/or a periodicity associated with the CG period. The CG occasions (shown as CG 1, CG 2, CG 3, and CG 4 in FIG. 5) may identify a resource or set of resources available to the UE for transmission of an uplink communication (e.g., data and/or control information). For example, the CG configuration may identify resource allocations for a PUSCH. In other words, the UE may support being configured with multiple CG PUSCH transmission occasions in a period of a single CG PUSCH configuration. For example, the UE may be configured with a CG period that includes multiple CG occasions and/or PUSCH occasions (e.g., multiple periodic uplink occasions) in a similar manner as described in connection with FIG. 4.

As shown by reference number 510, the UE may transmit, and the network node 110 may receive, an indication of one or more unused CG occasions associated with a given CG period. As used herein, an "unused" occasion (e.g., an unused CG occasion, an unused PUSCH occasion, and/or an unused periodic uplink occasion) may refer to an occasion that is configured for the UE (e.g., via a CG configuration or other configuration) and that is indicated as not to be used for an uplink communication by the UE (e.g., via signaling between the UE and the network node). An unused occasion may also be referred to as a skipped occasion. In other words, an unused occasion may not be an occasion that is actually unused, but rather an occasion that is indicated (by the UE) as being skipped or unused by the UE (e.g., and being intended to be skipped or unused by the UE). For example, the UE may support transmitting a dynamic indication of unused CG PUSCH occasion(s) based on uplink control information (UCI) (e.g., CG-UCI or another type of UCI). For example, the indication of one or more unused CG occasions may be included in a UCI communication (e.g., that is transmitted via a physical uplink control channel (PUCCH) or a PUSCH).

In some examples, the indication of the one or more unused CG occasions associated with a given CG period may include indications for respective CG occasions included in the CG period (e.g., an indication for each CG occasion indicating whether that CG occasion is skipped or unused). For example, the indication of the one or more unused CG occasions may include a bitmap that includes bits for respective CG occasions of the CG period. A value of a given bit may indicate whether a corresponding CG occasion is unused or skipped by the UE. For example, for the CG period shown in FIG. 5, the indication of the one or more unused CG occasions may include a bitmap that includes 4 bits (e.g., a first bit associated with the CG 1, a second bit associated with the CG 2, a third bit associated with the CG 3, and a fourth bit associated with the CG 4). As shown in FIG. 5, the CG 2, the CG 3, and the CG 4 may be unused or skipped by the UE for a given occurrence of the CG period. Therefore, the UE may transmit the indication of the one or more unused CG occasions that includes the bitmap having bit values of {1 1 1} (e.g., assuming that a value of "0" indicates that a corresponding CG occasion is used and a value of "1" indicates that a corresponding CG occasion is unused or skipped). For example, at a given time, the UE may determine that there is no data in a transmission buffer of the UE that is to be transmitted using the configured CG 2, the CG 3, and the CG 4 for the given occurrence of the CG period. Therefore, the UE may indicate that the CG 2, the CG 3, and the CG 4 will not be used by the UE for uplink communications during the given occurrence of the CG period.

The indication of the one or more unused CG occasions improves performance of the network node and/or overall network performance. For example, the network node may conserve resources (e.g., processing resources, computing resources, and/or other resources) that would have otherwise been used monitoring for and/or attempting to detect uplink communications that are transmitted via the one or more unused CG occasions. Additionally, the network node (or another network node) may be enabled to use resources (e.g., time domain resources, frequency domain resources, and/or spatial domain resources) associated with the one or more unused CG occasions for other purposes (e.g., for other UEs or other communications). This improves an efficiency and resource utilization of the wireless network, thereby improving overall network performance.

However, in some cases, uplink traffic (e.g., data) may arrive at the UE after the UE transmits the indication of the one or more unused CG occasions (e.g., and before a next CG period). Because the UE has already transmitted the indication of the one or more unused CG occasions, the UE may be unable to use the one or more unused CG occasions to transmit the uplink traffic. Therefore, the UE may have to wait until a next CG period and/or a next available CG occasion to transmit the uplink traffic. This may increase latency associated with the uplink traffic. In some cases, the uplink traffic may be associated with strict latency requirements and/or small PDBs. As a result, increasing the latency associated with the uplink traffic may cause a QoS of the uplink traffic not being met, may cause the uplink traffic to be dropped or discarded (e.g., due to an expiration of the PDB), and/or may cause a loss of information associated with the uplink traffic, among other examples. This negatively impacts the performance of the uplink traffic.

Some techniques and apparatuses described herein enable the reclaiming of unused uplink occasions (e.g., unused CG occasions or unused PUSCH occasions). In some aspects, a UE may be enabled to transmit an uplink communication using resources (e.g., time domain resources, frequency domain resources, spatial domain resources (e.g., a beam), and/or code domain resources) associated with an uplink occasion (e.g., a CG occasion or a PUSCH occasion) that was indicated (e.g., by the UE) as being unused or skipped by the UE. As used herein, "reclaiming" an occasion (e.g., an unused occasion) may refer to the UE transmitting an uplink communication using resources associated with an occasion that was previously indicated as being unused or skipped by the UE.

Enabling the UE to reclaim an unused uplink occasion (e.g., an unused CG occasion or an unused PUSCH occasion) reduces latency associated with traffic that arrives at the UE (e.g., at a buffer of the UE) after the UE transmits an indication of one or more unused uplink occasion (e.g., including the unused uplink occasion). Reducing the latency associated with the uplink traffic enables the UE to ensure QoS requirements of the uplink traffic are met, ensures that the uplink traffic is not dropped or discarded (e.g., due to an expiration of the PDB), and/or reduces a risk of a loss of information associated with the uplink traffic, among other examples. Therefore, a performance of the uplink traffic is improved by enabling the UE to reclaim an unused uplink occasion to transmit the uplink traffic.

In some aspects, the UE transmitting an uplink communication using resources associated with an unused uplink occasion may be based on, or otherwise associated with, one or more parameters of the uplink communication. In other words, the UE may be enabled to reclaim an unused occasion or a skipped occasion subject to one or more parameters or metrics satisfying criteria for reclaiming unused occasion or a skipped occasion. The one or more parameters may include a logical channel associated with the uplink communication, an LCG associated with the uplink communication, a PDB associated with the uplink communication, and/or a remaining PDB associated with uplink communication, among other examples. Limiting the reclaiming of an unused uplink occasion by the UE to scenarios where certain criteria are met may ensure that the UE only reclaims the unused uplink occasion for appropriate uplink traffic (e.g., for uplink traffic associated with strict latency requirements and/or a small remaining PDB). This reduces a complexity and/or conserves resources that would have otherwise been used associated the UE reclaiming an unused uplink occasion and transmitting an uplink communication using the unused uplink occasion for traffic that could otherwise wait to be transmitted in a next CG period or a next available CG occasion.

In some aspects, the UE may transmit a communication (e.g., a scheduling request of another communication) indicating that one or more unused uplink occasion is to be reclaimed. This enables a network node to identify which uplink occasions, from one or more unused uplink occasions, are to be reclaimed by the UE. This reduces a complexity and/or conserves resources that would have otherwise been associated with the network node performing a blind detection and/or decoding of the one or more unused uplink occasions to identify which uplink occasions have been reclaimed by the UE. In some aspects, a configuration (e.g., a CG configuration) may indicate that one or more uplink occasions are associated with a first one or more values for one or more respective communication parameters, and the uplink communication that is transmitted via a reclaimed unused uplink occasion may be associated with a second one or more values for the one or more respective communication parameters. In other words, a use of reclaimed unused uplink occasions may be restricted or reduces, such as by using less resources (e.g., less RBs), a lower transmit power, a lower MCS (e.g., an MCS associated with a lower index value), and/or a reduced resource pool, among other examples, as compared to the configuration of the uplink occasions. This mitigates a risk of interference with other UEs that may be communicating using resources associated with unused uplink occasions (e.g., because a network node may reallocate the resources to the other UEs after the UE indicates that the uplink occasions are to be unused or skipped by the UE).

As indicated above, FIG. 5 is provided as an example. Other examples may differ from what is described with respect to FIG. 5.

Figure 6:
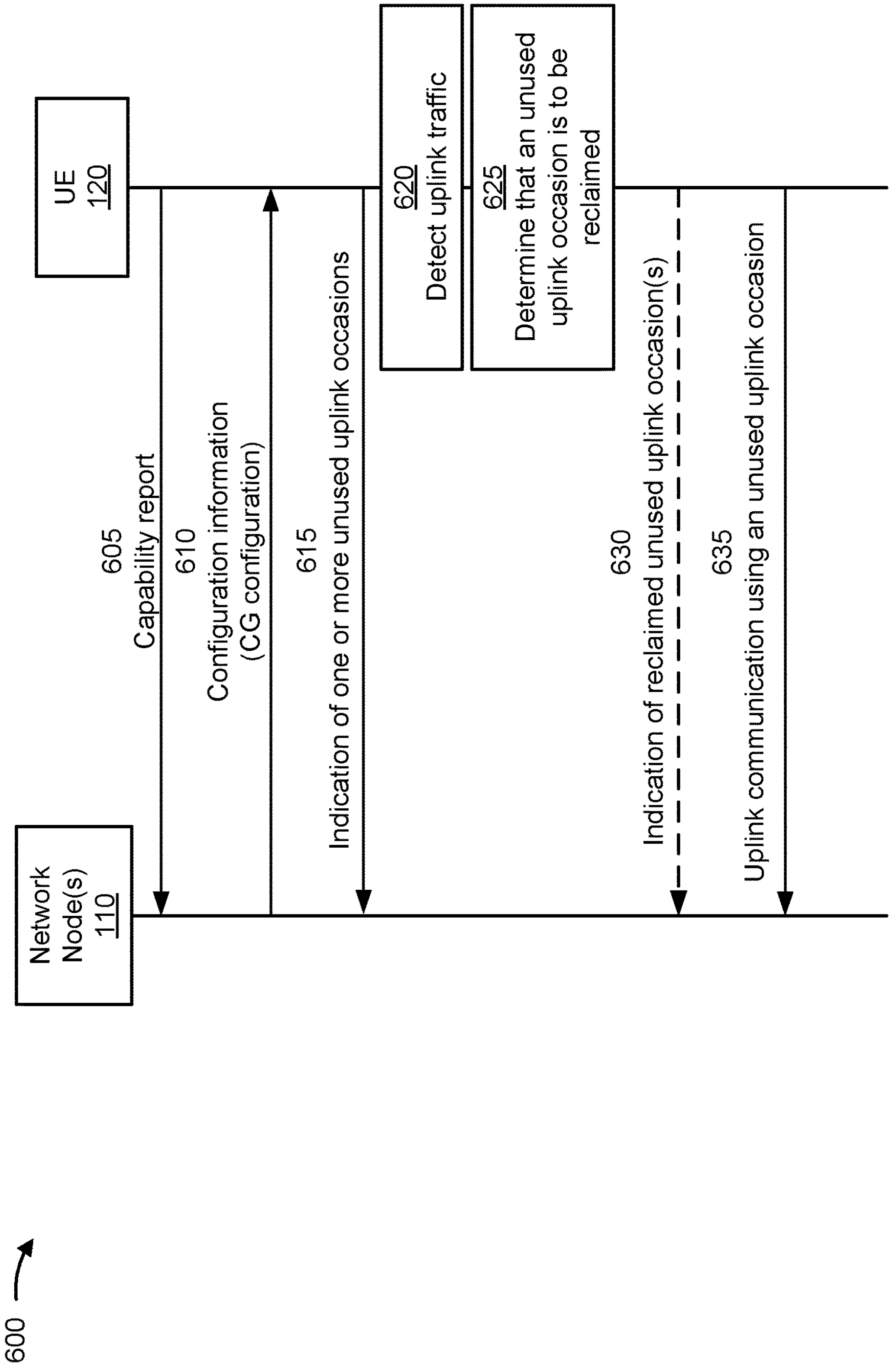
FIG. 6 is a diagram of an example associated with reclaiming unused uplink occasions, in accordance with the present disclosure.

FIG. 6 is a diagram of an example 600 associated with reclaiming unused uplink occasions, in accordance with the present disclosure. As shown in FIG. 6, one or more network nodes 110 (e.g., a base station, a CU, a DU, and/or an RU) may communicate with a UE 120. In some aspects, the network node(s) 110 and the UE 120 may be part of a wireless network (e.g., the wireless network 100). The UE 120 and the network node(s) 110 may have established a wireless connection prior to operations shown in FIG. 6. As used herein, an operation indicated as being performed by a network node 110 may be performed by one or more network nodes 110.

Although examples are described herein associated with CG occasions, the techniques and operations described herein may be similarly applied to other periodic occasions and/or communications. Further, although examples are described herein in connection with uplink communications, similar techniques and operations may be applied (e.g., by the UE 120 and/or the network node 110) for reclaiming downlink periodic and/or semi-static occasions, such as semi-persistent scheduling (SPS) occasions. Additionally, the techniques and operations described herein may be similarly applied other scenarios, such as where multiple communications or occasions are scheduled via a single communication or a single configuration (e.g., where multiple dynamic grant uplink communications are scheduled via a single DCI communication), among other examples.

As shown by reference number 605, the UE 120 may transmit, and the network node 110 may receive or obtain, a capability report. The capability report may indicate UE support for reclaiming unused uplink occasions, as described in more detail elsewhere herein. In some aspects, the capability report may indicate UE support for indicating unused uplink occasions (e.g., support for providing a dynamic indication of unused CG occasions and/or unused PUSCH occasions). For example, the capability report may indicate that the UE 120 supports skipping and/or not using a configured or scheduled occasion (for example, of multiple occasions that are scheduled together, such as via a single CG configuration). Additionally, the capability report may indicate that the UE 120 supports transmitting an indication of configured or scheduled occasions that are to be skipped or unused by the UE 120. Further, the capability report may indicate that the UE 120 supports reclaiming (e.g., using for transmissions) configured or scheduled occasions that indicated (e.g., by the UE 120) as being skipped or unused by the UE 120. The capability report may be included in an uplink communication, a PUCCH communication, a PUSCH communication, a UCI communication, and/or a UE assistance information (UAI) communication, among other examples.

As shown by reference number 610, the network node 110 may transmit, and the UE 120 may receive, configuration information. In some aspects, the UE 120 may receive the configuration information via one or more of system information signaling, RRC signaling, one or more MAC control elements (MAC-CEs), and/or DCI, among other examples. In some aspects, the configuration information may include an indication of one or more configuration parameters (e.g., stored by the UE 120 and/or previously indicated by the network node 110 or other network device) for selection by the UE 120, and/or explicit configuration information for the UE 120 to use to configure itself, among other examples.

In some aspects, the configuration information may include a CG configuration or another configuration of periodic and/or semi-static communications. For example, the configuration information may indicate one or more uplink occasions. For example, the one or more uplink occasions may include CG occasions, PUSCH occasions, and/or other periodic and/or semi-static occasions.

For example, the network node 110 may transmit, and the UE 120 may receive, a CG configuration for the UE 120. For example, the network node 110 may transmit the configuration information (e.g., in an RRC communication, in DCI, and/or in another signaling communication) that identifies a CG period associated with multiple CG (or PUSCH) occasions. In some examples, the configuration information identifying the CGs may indicate resource allocations (e.g., in a time domain, frequency domain, spatial domain, and/or code domain) associated with respective CG occasions or PUSCH occasions and/or a periodicity associated with the CG period. The CG occasions may be associated with a resource or set of resources available to the UE 120 for transmission of an uplink communication (e.g., data and/or control information). For example, the CG configuration may identify resource allocations for a PUSCH. In other words, the UE may support being configured with multiple CG PUSCH transmission occasions in a period of a single CG PUSCH configuration. For example, the UE 120 may be configured with a CG period that includes multiple CG occasions and/or PUSCH occasions (e.g., multiple uplink occasions) in a similar manner as described in connection with FIGS. 4 and 5.

In some aspects, the configuration information may indicate criteria or other conditions associated with reclaiming unused uplink occasions. Additionally, or alternatively, the criteria or other conditions may be defined, or otherwise fixed, by a wireless communication standard, such as the 3GPP (e.g., in such examples the criteria or other conditions may not be indicated to the UE 120 by the network node 110). The criteria or other conditions may define scenarios in which the UE 120 may reclaim an unused or skipped uplink occasion. For example, the criteria or other conditions may indicate one or more logical channels and/or one or more logical channel groups for which the UE 120 is permitted to reclaim an unused or skipped uplink occasion.

A logical channel may refer to virtual communication path that is established within a physical communication channel to provide a means of transmitting information between two or more devices. Logical channels may be used to organize and prioritize data transmission, enabling the efficient use of limited bandwidth resources. In a wireless communication system, information may be divided into data packets and transmitted via an over the air interface. A physical communication channel can be congested due to multiple devices transmitting data simultaneously. To ensure that information is transmitted efficiently and effectively, logical channels may be used to separate the data into different streams, each with associated unique characteristics. For example, each logical channel may be defined by a set of parameters, such as a data rate, a latency requirement, and/or an MCS, among other examples, which determine the characteristics and quality of a data transmission associated with that logical channel. For example, the configuration information may indicate that the UE 120 is only permitted to reclaim an unused or skipped uplink occasion for the purpose of transmitting data or uplink traffic that is associated with certain logical channels and/or logical channel groups. For example, the configuration information may indicate that the UE 120 is only permitted to reclaim an unused or skipped uplink occasion for the purpose of transmitting data or uplink traffic that is associated with logical channels and/or logical channel groups associated with high QoS requirements and/or strict (e.g., low) latency requirements, among other examples.

In some aspects, the criteria or other conditions may indicate a PDB threshold associated with a PDB associated with uplink traffic, and/or a remaining PDB associated with uplink traffic. For example, the criteria or other conditions may indicate that if a PDB associated with uplink traffic, and/or a remaining PDB associated with uplink traffic satisfies (e.g., is less than or equal to) the PDB threshold, then the UE 120 may reclaim an unused or skipped uplink occasion for the purpose of transmitting the uplink traffic. Otherwise (e.g., if a PDB associated with uplink traffic, and/or a remaining PDB associated with uplink traffic does not satisfy (e.g., is greater than) the PDB threshold), the UE may not reclaim an unused or skipped uplink occasion for the purpose of transmitting the uplink traffic. This reduces a complexity and/or conserves resources that would have otherwise been used associated the UE 120 reclaiming an unused uplink occasion and transmitting an uplink communication using the unused uplink occasion for traffic that could otherwise wait to be transmitted in a next period or a next available occasion.

In some aspects, the configuration information may indicate whether uplink occasions can be reclaimed. For example, the network node 110 may transmit, and the UE 120 may receive, an indication of whether the UE 120 is permitted to reclaim unused or skipped uplink occasions (e.g., is permitted to transmit using uplink occasions that are indicated, by the UE 120, as unused uplink occasions). The indication of whether the UE 120 is permitted to transmit using uplink occasions that are indicated as unused uplink occasions may be communicated via radio resource control signaling, MAC-CE signaling, and/or DCI signaling. In other words, the indication of whether the UE 120 is permitted to transmit using uplink occasions that are indicated as unused uplink occasions may be communicated via Layer 3 signaling, Layer 2 signaling, and/or Layer 1 signaling.

In some aspects, the configuration information may indicate which occasions, from multiple configured uplink occasions, can be reclaimed. For example, for a CG period, a first one or more occasions (e.g., PUSCH occasions) may be skipped and cannot be reclaimed (e.g., if skipped or indicated as unused), and a second one or more occasions (e.g., PUSCH occasions) may be skipped but may be reclaimed. In some aspects, all occasions (e.g., PUSCH occasions) may be skipped and reclaimed. In other aspects, all occasions (e.g., PUSCH occasions) may be skipped and cannot be reclaimed (e.g., if skipped or indicated as unused). As described elsewhere herein, the configuration information may indicate that one or more (or all) occasions of a given CG period (or other period) can be reclaimed by the UE 120 (e.g., after being indicated as skipped or unused by the UE 120) subject to one or more criteria or other conditions.

The UE 120 may configure itself based at least in part on the configuration information. In some aspects, the UE 120 may be configured to perform one or more operations described herein based at least in part on the configuration information.

As shown by reference number 615, the UE 120 may transmit, and the network node 110 may receive, an indication of one or more unused uplink occasions. For example, the UE 120 may transmit an indication of one or more unused uplink occasions of the one or more uplink occasions (e.g., configured or scheduled for the UE 120, such as via the configuration information). In some aspects, the UE 120 may support transmitting a dynamic indication of unused CG PUSCH occasion(s) based on UCI (e.g., CG-UCI or another type of UCI). For example, the indication of one or more unused uplink occasions may be included in a UCI communication (e.g., that is transmitted via a PUCCH or a PUSCH).

In some examples, the indication of the one or more unused uplink occasions may be associated with a given period (e.g., CG period) and may include indications for respective uplink occasions included in the period (e.g., an indication for each uplink occasion indicating whether that uplink occasion is skipped or unused). For example, the indication of the one or more unused uplink occasions may include a bitmap that includes bits for respective uplink occasions of the period. A value of a given bit may indicate whether a corresponding uplink occasion is unused or skipped by the UE 120. For example, at a given time, the UE 120 may determine that there is no data in a transmission buffer of the UE that is to be transmitted using one or more configured or scheduled uplink occasions. Therefore, the UE 120 may indicate that one or more configured or scheduled uplink occasions are not intended to be used by the UE 120 for uplink communications (e.g., during a given occurrence of the CG period). Such uplink occasions are referred to herein as "unused uplink occasions."

As shown by reference number 620, the UE 120 may detect uplink traffic to be transmitted by the UE 120. For example, the UE 120 may detect an arrival of uplink traffic at a buffer (e.g., a transmission buffer) of the UE 120. For example, the uplink traffic may arrive at the UE 120 after the UE 120 transmits the indication of one or more unused uplink occasions (e.g., described above in connection with reference number 615). In some aspects, the uplink traffic may arrive at the UE 120 after the UE 120 transmits the indication of one or more unused uplink occasions and before the end of a period (e.g., a CG period) associated with the one or more unused uplink occasions. The uplink traffic may include, or be associated with, an uplink communication and/or one or more packets (e.g., data packets). In some aspects, the uplink traffic may be associated with one or more parameters, such as a logical channel, a logical channel group, a PDB, and/or a remaining PDB, among other examples.

As shown by reference number 625, the UE 120 may determine that one or more unused uplink occasions are to be reclaimed (e.g., to transmit the uplink traffic). For example, the UE 120 may determine that one or more uplink occasions, that were previously indicated as being unused or skipped by the UE 120, are to be used by the UE 120 to transmit the uplink traffic. In some aspects, the UE 120 may determine that one or more unused uplink occasions are to be reclaimed based on the uplink traffic arriving at the UE 120 after the UE 120 transmits the indication of one or more unused uplink occasions and before the end of a period (e.g., a CG period) associated with the one or more unused uplink occasions.

Additionally, or alternatively, the UE 120 may determine that one or more unused uplink occasions are to be reclaimed based on one or more parameters associated with the uplink traffic. For example, the UE 120 may determine that one or more unused uplink occasions are to be reclaimed based on the one or more parameters meeting or satisfying criteria or other conditions associated with reclaiming unused occasions, as described in more detail elsewhere herein. For example, the one or more parameters may include a logical channel and/or a logical channel group associated with the uplink traffic. In other words, the UE 120 may determine that one or more unused uplink occasions are to be reclaimed based on a logical channel and/or a logical channel group associated with the uplink traffic being indicated as permitted for reclaiming unused occasions (e.g., indicated via the criteria or other conditions associated with reclaiming unused occasions).

For example, the configuration information may indicate one or more allowed logical channel groups (e.g., that are permitted to be associated with reclaiming unused uplink occasions). For example, the configuration information may include an RRC information element that indicates the one or more allowed logical channel groups (e.g., an allowedLCGList information element). The UE 120 may be permitted to reclaim an unused uplink occasion based on, or associated with, a logical channel of a communication being included in the one or more allowed logical channel groups.

Additionally, or alternatively, the one or more parameters may include a PDB and/or a remaining PDB associated with the uplink traffic. For example, the UE 120 may determine that one or more unused uplink occasions are to be reclaimed based on a PDB and/or a remaining PDB associated with the uplink traffic satisfying the PDB threshold. Additionally, or alternatively, the UE 120 may determine that one or more unused uplink occasions are to be reclaimed based on receiving an indication (e.g., from the network node 110) that the UE 120 is permitted or enabled to reclaim unused uplink occasions (e.g., under certain conditions). Additionally, or alternatively, the UE 120 may determine that one or more unused uplink occasions are to be reclaimed based on a configuration of the uplink occasions indicating that the one or more unused uplink occasions are permitted to be reclaimed.

In some aspects, the UE 120 may determine that one or more unused uplink occasions are to be reclaimed based on a timing associated with the arrival of the uplink traffic. For example, the UE 120 may determine that one or more unused uplink occasions are to be reclaimed based on an amount of time from a time at which the uplink traffic arrives at the UE 120 and a time associated with an unused uplink occasion satisfying a first threshold (e.g., where the threshold is associated with an amount of time). In some aspects, the first threshold may be associated with a processing capability of the UE 120 (e.g., a PUSCH processing capability). As another example, the UE 120 may determine that one or more unused uplink occasions are to be reclaimed based on an amount of time from the time at which the uplink traffic arrives at the UE 120 and a time at which the UE 120 transmits the indication of the unused uplink occasions satisfying a second threshold. In other words, if an amount of time since the UE 120 indicated that the uplink occasions were to be unused becomes too large, then the UE 120 may be unable to reclaim the unused uplink occasions.

In some aspects, the UE 120 may autonomously (e.g., without signaling to the network node 110) reclaim the one or more unused uplink occasions. For example, based on the one or more conditions or criteria described above, the UE 120 may autonomously (e.g., without signaling to the network node 110) reclaim the one or more unused uplink occasions. This conserves signaling overhead and reduces latency associated with reclaiming the one or more unused uplink occasions.

In some aspects, as shown by reference number 630, the UE 120 may transmit, and the network node 110 may receive, a communication indicating that the one or more unused uplink occasions are to be reclaimed. For example, the communication may include a scheduling request, UCI, a channel state information (CSI) report, a buffer status report, and/or a MAC-CE communication, among other examples. In some aspects, the communication may indicate that all, or a subset of, the one or more unused uplink occasions are to be reclaimed. For example, the communication may include indications for which unused uplink occasion are to be reclaimed by the UE 120. For example, the communication may include bits (e.g., a bitmap) for respective unused uplink occasion, where values of the bits indicate whether the respective unused uplink occasion are to be reclaimed. In some aspects, the communication may include a replacement or an update to the bitmap that was included in the indication of the one or more unused uplink occasions (e.g., transmitted by the UE 120 as described above in connection with reference number 615).

In some aspects, the communication may include an indication that at least one of the one or more unused uplink occasions is to be reclaimed. In other words, the communication may flag that at least one of the one or more unused uplink occasions is to be reclaimed, but may not indicate which unused uplink occasions are to be reclaimed. In some aspects, the UE 120 may transmit, and the network node 110 may receive, another communication that includes indications associated with respective uplink occasions, of the one or more uplink occasions, the indications indicating whether the respective uplink occasions are reclaimed. For example, after flagging that at least one of the one or more unused uplink occasions is to be reclaimed, the UE 120 may indicate which unused uplink occasions are to be reclaimed (e.g., the communication can be used as only a flag to reclaim resources, and the communication can be followed by an indication of the actual bitmap to indicate the reclaiming).

In some aspects, reclaiming the unused uplink occasion(s) may be based on, or associated with, a timing of the communication. For example, reclaiming an unused uplink occasion (e.g., transmitting the uplink communication using resources associated with the unused uplink occasion) may be based on, or associated with, an amount of time from a first time at which the communication is transmitted to a second time associated with the unused uplink occasion satisfying a threshold (e.g., the first threshold or another threshold). For example, the first time may be a time at which the communication is received and processed at the network node 110 (e.g., may include processing time of the communication at the network node 110). The threshold may be based on, or associated with, a processing capability of the UE 120 (e.g., a PUSCH processing capability). For example, an amount of time associated with the threshold may be greater than or equal to an amount of time indicated by the PUSCH processing capability of the UE 120.

As another example, reclaiming an unused uplink occasion (e.g., transmitting the uplink communication using resources associated with the unused uplink occasion) may be based on, or associated with, an amount of time from a first time at which the indication of the one or more unused uplink occasions is transmitted to a second time at which the communication is transmitted satisfying a threshold (e.g., the second threshold or another threshold). For example, if an amount of time since the UE 120 transmitted the indication of the one or more unused uplink occasions (e.g., transmitted by the UE 120 as described above in connection with reference number 615) becomes too large, then the UE 120 may be unable to reclaim the unused uplink occasion(s) (e.g., because the network node 110 may have reallocated the resources for another purpose and/or to another UE). For example, an amount of time associated with the threshold (e.g., the second threshold or another threshold) may be associated with, or based on, an amount of time allowed for the network node 110 to have made a decision to reallocate the unused occasion(s) to another UE.

In some aspects, a configuration associated with the communication indicates that the communication is associated with one or more logical channels and/or one or more logical channel groups. For example, the communication may be a scheduling request. A configuration of the scheduling request may indicate that the scheduling request is to be used for data associated with one or more logical channels and/or one or more logical channel groups. In some aspects, reclaiming an unused uplink occasion (e.g., transmitting the uplink communication using resources associated with the unused uplink occasion) may be based on, or associated with, the uplink traffic (e.g., to be transmitted via a reclaimed unused uplink occasion) being associated with a logical channel included in the one or more logical channels and/or the one or more logical channel groups indicated by the configuration associated with the communication. For example, only new data belonging to a logical channel group associated with a scheduling request configuration can trigger UE 120 to reclaim unused occasion(s).

In some aspects, the communication may be transmitted via resources of another uplink occasion. For example, the UE 120 may transmit the communication via an occasion (e.g., a CG occasion or a PUSCH occasion) that is associated with a configuration and/or period of the one or more unused uplink occasions. For example, the UE 120 may transmit, via resources associated with an uplink occasion of the one or more uplink occasions, an updated indication of the one or more uplink occasions, the updated indication indicating that an unused uplink occasion is to be used. For example, the updated indication may be included in a communication that is multiplexed with the resources associated with the uplink occasion. For example, occasions associated with the same configuration and/or period may not be intra slot (e.g., there may be one or more slots between uplink occasions). Therefore, the UE 120 may transmit the communication in an occasion (e.g., to override or update the previously transmitted indication of the one or more unused uplink occasions). This conserves resources and/or reduces latency associated with indicating the one or more unused uplink occasions that are to be reclaimed by the UE 120.

As shown by reference number 635, the UE 120 may transmit, and the network node 110 may receive, an uplink communication using an unused uplink occasion. For example, the UE 120 may transmit, and the network node 110 may receive, the uplink communication using resources associated with an unused uplink occasion of the one or more unused uplink occasions. In some aspects, the communication of the uplink communication using resources associated with an unused uplink occasion may be based on one or more parameters of the uplink communication and/or on criteria or conditions of reclaiming being met, as described in more detail elsewhere herein.

In some aspects, the configuration information may indicate that the one or more uplink occasions are associated with a first one or more values for one or more respective communication parameters. The uplink communication may be associated with a second one or more values for the one or more respective communication parameters. In other words, for uplink communications that are transmitted via reclaimed unused uplink occasions, the UE 120 may use different values for the one or more communication parameters. For example, the UE 120 may have a restricted use for the reclaimed unused uplink occasions. The one or more communication parameters may include a number of resources, a transmit power, a modulation and coding scheme, and/or a quantity of selectable resources from a set of resources, among other examples. For example, the UE 120 may transmit the uplink communication (e.g., via resources associated with an unused uplink occasion) using a lower number of resources (e.g., a lower number of RBs) compared to a quantity of resources configured for the unused uplink occasion, a lower transmit power, a lower MCS (e.g., an MCS associated with a lower index value) compared to an MCS configured for the unused uplink occasion, and/or less selectable resources (e.g., a subset of resources) from a configured resource pool or configured multiple resources configured for the unused uplink occasion, among other examples. This mitigates a risk of interference with other UEs that may be communicating using resources associated with unused uplink occasions (e.g., because the network node 110 may reallocate the resources to the other UEs after the UE 120 indicates that the uplink occasions are to be unused or skipped by the UE 120).

As indicated above, FIG. 6 is provided as an example. Other examples may differ from what is described with respect to FIG. 6.

Figure 7:
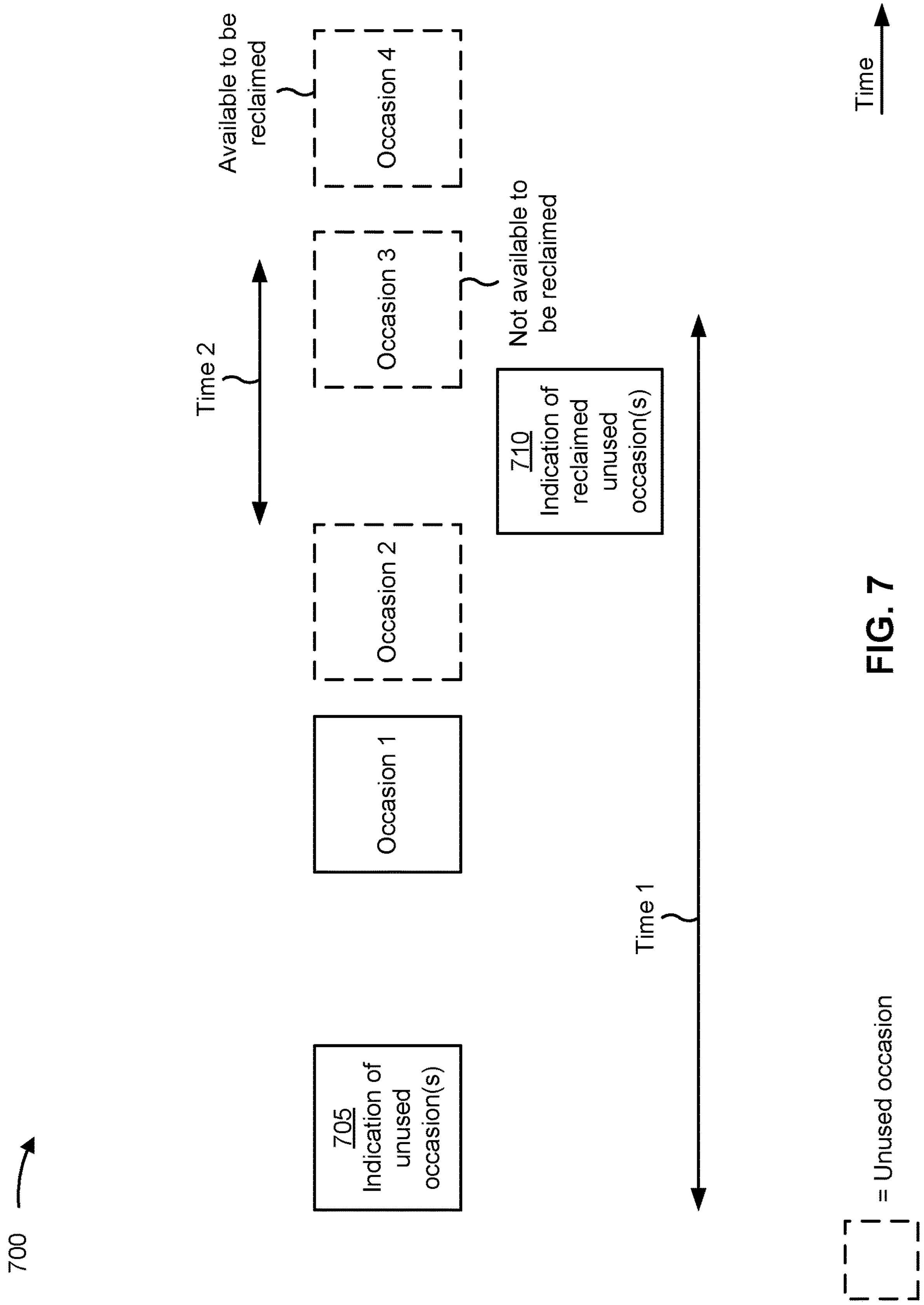
FIG. 7 is a diagram of an example associated with reclaiming unused uplink occasions, in accordance with the present disclosure.

FIG. 7 is a diagram of an example 700 associated with reclaiming unused uplink occasions, in accordance with the present disclosure.

In some aspects, a network node (e.g., the network node 110) may transmit, and a UE (e.g., the UE 120) may receive, a configuration of one or more uplink occasions for the UE. For example, the network node may transmit configuration information (e.g., in an RRC communication, in DCI, and/or in another signaling communication) that identifies a period associated with multiple CG (or PUSCH) occasions. In some examples, the configuration information identifying the CGs may indicate resource allocations (e.g., in a time domain, frequency domain, spatial domain, and/or code domain) associated with respective CG occasions or PUSCH occasions and/or a periodicity associated with the CG period. The occasions (shown as occasion 1, occasion 2, occasion 3, and occasion 4 in FIG. 7) may identify a resource or set of resources available to the UE for transmission of an uplink communication (e.g., data and/or control information). For example, the CG configuration may identify resource allocations for a PUSCH. In some aspects, the multiple occasions may be associated with the same CG configuration and/or the same CG period.

As shown in FIG. 7, the UE may transmit, and the network node may receive, an indication 705 of one or more unused uplink occasions associated with a given period. For example, the UE may support transmitting a dynamic indication of unused CG PUSCH occasion(s) based on UCI (e.g., CG-UCI or another type of UCI). For example, the indication of one or more unused CG occasions may be included in a UCI communication. The indication of the one or more unused uplink occasions may be similar to the indication of the one or more unused uplink occasions described in more detail elsewhere herein. For example, as shown in FIG. 7, the occasion 2, the occasion 3, and the occasion 4 may be indicated as unused or skipped by the UE.

The UE may transmit, and the network node may receive, a communication 710 indicating that the one or more unused uplink occasions are to be reclaimed. For example, the communication may include a scheduling request, UCI, a CSI report, a buffer status report, and/or a MAC-CE communication, among other examples. For example, the communication 710 may be similar to the communication indicating that the one or more unused uplink occasions are to be reclaimed described in more detail elsewhere herein, such as in connection with reference number 630 of FIG. 6.

As shown in FIG. 7, unused uplink occasion that are eligible to be reclaimed may be based on, or associated with, a timing of the communication. For example, the network node may configure, or a wireless communication standard may define, an amount of time (shown as Time 1 in FIG. 7) from a time at which the indicating 705 is transmitted during which the UE may reclaim unused uplink occasions. For example, after the Time 1 expires, the UE may be unable to reclaim unused uplink occasions. The Time 1 may be, or may be associated with, an amount of time of the second threshold described in connection with FIG. 6.

As shown in FIG. 7, the UE may be enabled to reclaim unused uplink occasions that occur at least a Time 2 from a time at which the communication 710 is transmitted by the UE and/or received (e.g., and processed) by the network node. For example, as shown in FIG. 7, the occasion 3 may be not available or ineligible to be reclaimed because the occasion 3 occurs less than the Time 2 from a time at which the communication 710 is transmitted by the UE and/or received (e.g., and processed) by the network node. Similarly, the occasion 4 may be available or eligible to be reclaimed because the occasion 4 occurs more than the Time 2 from the time at which the communication 710 is transmitted by the UE and/or received (e.g., and processed) by the network node. The Time 2 may be based on, or associated with, a processing capability of the UE (e.g., a PUSCH processing capability). For example, the Time 2 may be, or may be associated with, an amount of time of the first threshold described in connection with FIG. 6.

As indicated above, FIG. 7 is provided as an example. Other examples may differ from what is described with respect to FIG. 7.

Figure 8:
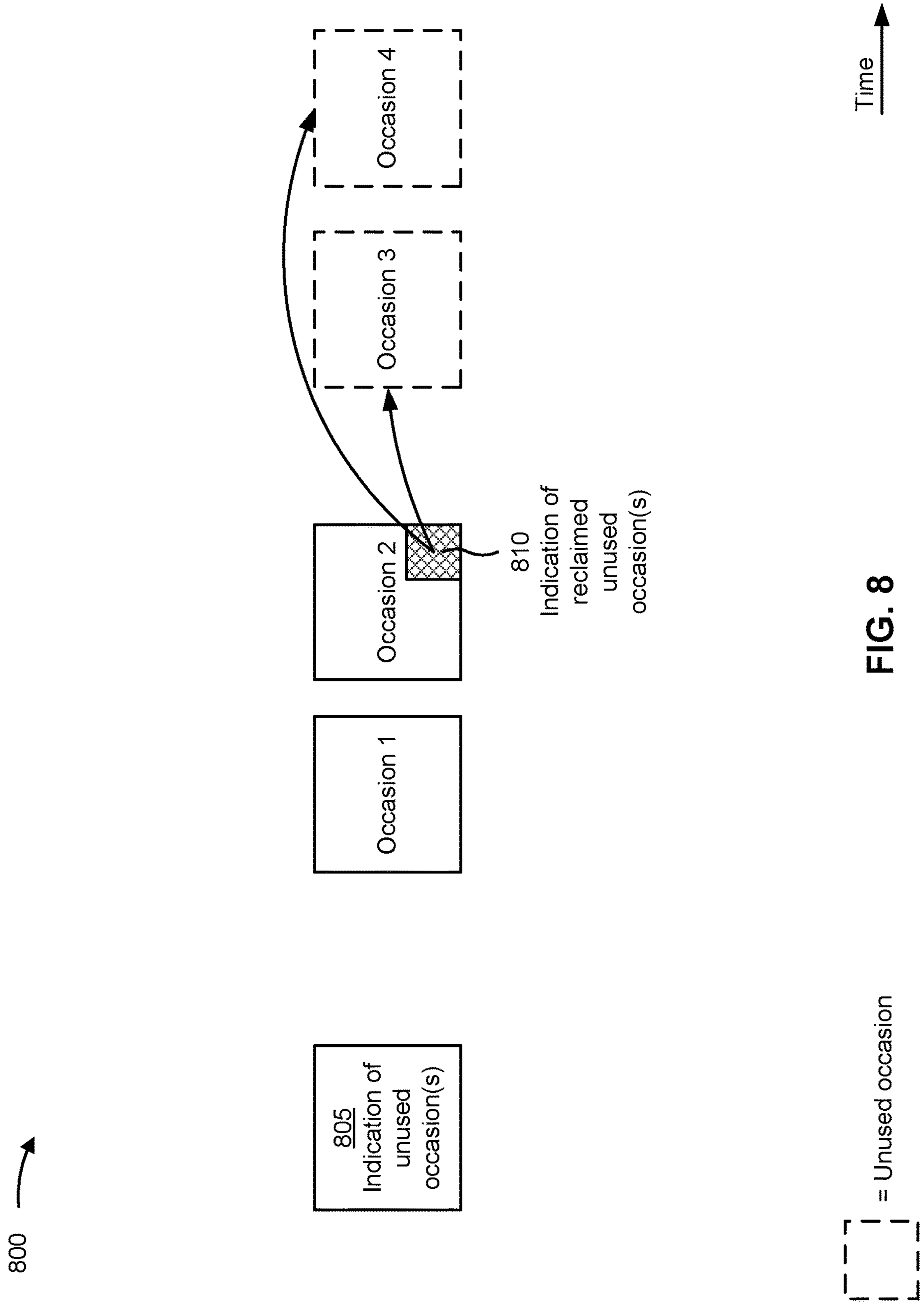
FIG. 8 is a diagram of an example associated with reclaiming unused uplink occasions, in accordance with the present disclosure.

FIG. 8 is a diagram of an example 800 associated with reclaiming unused uplink occasions, in accordance with the present disclosure.

In some aspects, a network node (e.g., the network node 110) may transmit, and a UE (e.g., the UE 120) may receive, a configuration of one or more uplink occasions for the UE. For example, the network node may transmit configuration information (e.g., in an RRC communication, in DCI, and/or in another signaling communication) that identifies a period associated with multiple CG (or PUSCH) occasions. In some examples, the configuration information identifying the CGs may indicate resource allocations (e.g., in a time domain, frequency domain, spatial domain, and/or code domain) associated with respective CG occasions or PUSCH occasions and/or a periodicity associated with the CG period. The occasions (shown as occasion 1, occasion 2, occasion 3, and occasion 4 in FIG. 8) may identify a resource or set of resources available to the UE for transmission of an uplink communication (e.g., data and/or control information). For example, the CG configuration may identify resource allocations for a PUSCH. In some aspects, the multiple occasions may be associated with the same CG configuration and/or the same CG period.

As shown in FIG. 8, the UE may transmit, and the network node may receive, an indication 805 of one or more unused uplink occasions associated with a given period. For example, the UE may support transmitting a dynamic indication of unused CG PUSCH occasion(s) based on UCI (e.g., CG-UCI or another type of UCI). For example, the indication of one or more unused CG occasions may be included in a UCI communication. The indication of the one or more unused uplink occasions may be similar to the indication of the one or more unused uplink occasions described in more detail elsewhere herein. For example, as shown in FIG. 8, the occasion 3 and the occasion 4 may be indicated as unused or skipped by the UE.

The UE may transmit, and the network node may receive, a communication 810 indicating that the one or more unused uplink occasions are to be reclaimed. For example, the communication may include a scheduling request, UCI, a CSI report, a buffer status report, and/or a MAC-CE communication, among other examples. For example, the communication 810 may be similar to the communication indicating that the one or more unused uplink occasions are to be reclaimed described in more detail elsewhere herein, such as in connection with reference number 630 of FIG. 6.

As shown in FIG. 8, the communication may be included in, or multiplexed with, resources (e.g., time domain resources, frequency domain resources, and/or spatial domain resources) associated with the occasion 2. For example, the UE may transmit, via resources associated with an uplink occasion (e.g., the occasion 2) of the one or more uplink occasions, an updated indication of the one or more uplink occasions, the updated indication indicating that an unused uplink occasion is to be used. For example, the updated indication may be included in a communication that is multiplexed with the resources associated with the occasion 2. For example, occasions associated with the same configuration and/or period may not be intra slot (e.g., there may be one or more slots between uplink occasions). Therefore, the UE may transmit the communication in the occasion 2 (e.g., to override or update the previously transmitted indication 805 of the one or more unused uplink occasions). This conserves resources and/or reduces latency associated with indicating the one or more unused uplink occasions that are to be reclaimed by the UE.

As indicated above, FIG. 8 is provided as an example. Other examples may differ from what is described with respect to FIG. 8.

Figure 9:
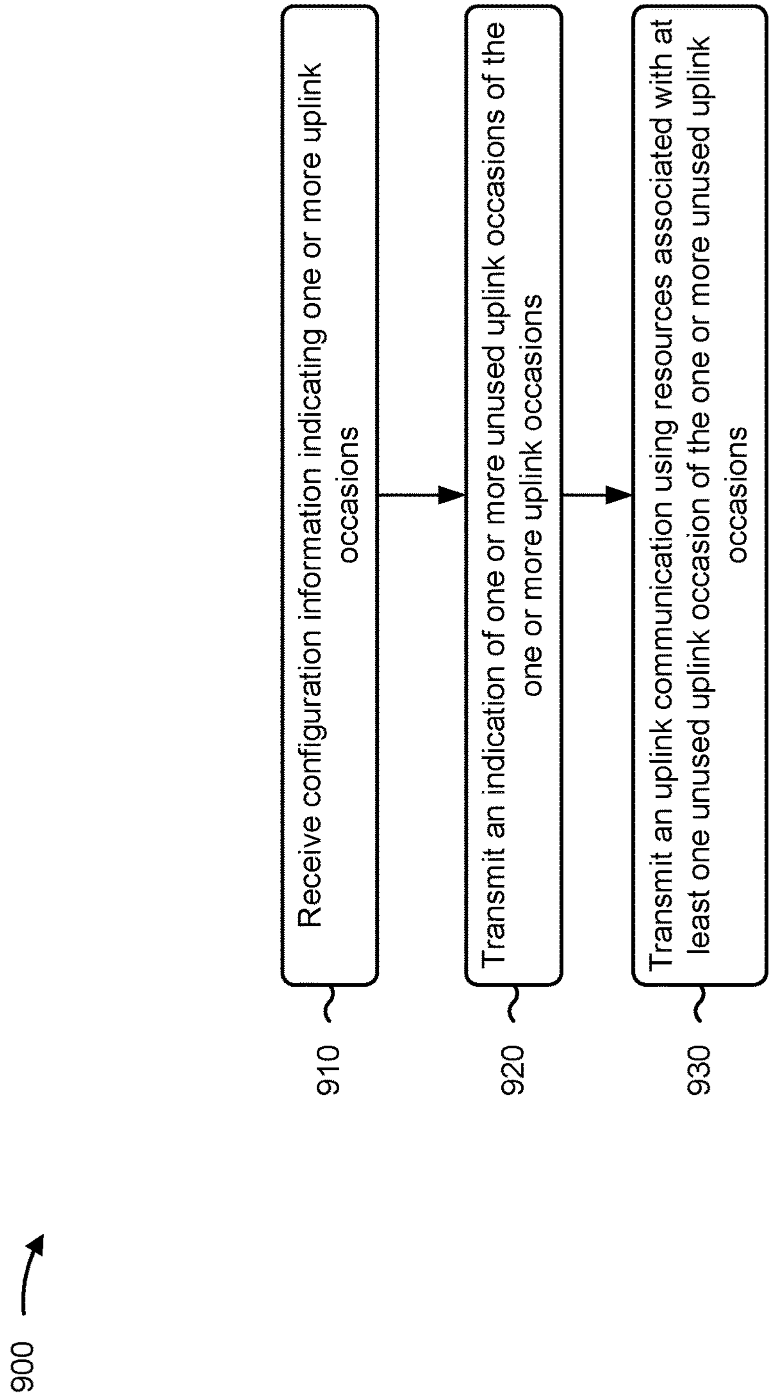
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with reclaiming unused uplink occasions.

As shown in FIG. 9, in some aspects, process 900 may include receiving configuration information indicating one or more uplink occasions (block 910). For example, the UE (e.g., using reception component 1102 and/or communication manager 1106, depicted in FIG. 11) may receive configuration information indicating one or more uplink occasions, as described above.

As further shown in FIG. 9, in some aspects, process 900 may include transmitting an indication of one or more unused uplink occasions of the one or more uplink occasions (block 920). For example, the UE (e.g., using transmission component 1104 and/or communication manager 1106, depicted in FIG. 11) may transmit an indication of one or more unused uplink occasions of the one or more uplink occasions, as described above.

As further shown in FIG. 9, in some aspects, process 900 may include transmitting an uplink communication using resources associated with at least one unused uplink occasion of the one or more unused uplink occasions (block 930). For example, the UE (e.g., using transmission component 1104 and/or communication manager 1106, depicted in FIG. 11) may transmit an uplink communication using resources associated with at least one unused uplink occasion of the one or more unused uplink occasions, as described above.

Process 900 may include additional aspects, such as any single aspect or any combination of aspects described below and/or in connection with one or more other processes described elsewhere herein.

In a first aspect, transmitting the uplink communication using resources associated with the at least one unused uplink occasion is associated with one or more parameters of the uplink communication.

In a second aspect, alone or in combination with the first aspect, the one or more parameters include a logical channel group associated with the uplink communication.

In a third aspect, alone or in combination with one or more of the first and second aspects, the configuration information indicates whether uplink occasions, of the one or more uplink occasions, can be reclaimed, and transmitting the uplink communication using resources associated with the at least one unused uplink occasion is associated with the configuration information indicating that the at least one unused uplink occasion can be reclaimed.

In a fourth aspect, alone or in combination with one or more of the first through third aspects, process 900 includes receiving an indication of whether the UE is permitted to transmit using uplink occasions that are indicated as unused uplink occasions.

In a fifth aspect, alone or in combination with one or more of the first through fourth aspects, transmitting the uplink communication using resources associated with the at least one unused uplink occasion is associated with the UE being permitted to transmit using uplink occasions that are indicated as unused uplink occasions.

In a sixth aspect, alone or in combination with one or more of the first through fifth aspects, the indication of whether the UE is permitted to transmit using uplink occasions that are indicated as unused uplink occasions is communicated via radio resource control signaling.

In a seventh aspect, alone or in combination with one or more of the first through sixth aspects, the indication of whether the UE is permitted to transmit using uplink occasions that are indicated as unused uplink occasions is communicated via medium access control signaling.

In an eighth aspect, alone or in combination with one or more of the first through seventh aspects, the indication of whether the UE is permitted to transmit using uplink occasions that are indicated as unused uplink occasions is communicated via downlink control information signaling.

In a ninth aspect, alone or in combination with one or more of the first through eighth aspects, process 900 includes transmitting a communication indicating that the at least one unused uplink occasion is to be reclaimed.

In a tenth aspect, alone or in combination with one or more of the first through ninth aspects, transmitting the uplink communication using resources associated with the at least one unused uplink occasion is associated with an amount of time from a first time at which the communication is transmitted to a second time associated with the at least one unused uplink occasion satisfying a threshold.

In an eleventh aspect, alone or in combination with one or more of the first through tenth aspects, the threshold is associated with a processing capability of the UE.

In a twelfth aspect, alone or in combination with one or more of the first through eleventh aspects, transmitting the uplink communication using resources associated with the at least one unused uplink occasion is associated with an amount of time from a first time at which the indication of the one or more unused uplink occasions is transmitted to a second time at which the communication is transmitted satisfying a threshold.

In a thirteenth aspect, alone or in combination with one or more of the first through twelfth aspects, the communication includes indications associated with respective uplink occasions, of the one or more uplink occasions, the indications indicating whether the respective uplink occasions are reclaimed.

In a fourteenth aspect, alone or in combination with one or more of the first through thirteenth aspects, the communication includes an indication that at least one of the one or more unused uplink occasions is to be reclaimed, and process 900 includes transmitting another communication that includes indications associated with respective uplink occasions, of the one or more uplink occasions, the indications indicating whether the respective uplink occasions are reclaimed.

In a fifteenth aspect, alone or in combination with one or more of the first through fourteenth aspects, the communication is transmitted via resources associated with an uplink occasion of the one or more uplink occasions.

In a sixteenth aspect, alone or in combination with one or more of the first through fifteenth aspects, the communication includes at least one of a scheduling request, uplink control information, a CSI report, a buffer status report, or a MAC control element communication.

In a seventeenth aspect, alone or in combination with one or more of the first through sixteenth aspects, a configuration associated with the communication indicates that the communication is associated with one or more logical channels, and transmitting the uplink communication using resources associated with the at least one unused uplink occasion is associated with the uplink communication being associated with at least one of the one or more logical channels.

In an eighteenth aspect, alone or in combination with one or more of the first through seventeenth aspects, process 900 includes transmitting, via resources associated with an uplink occasion of the one or more uplink occasions, an updated indication of the one or more unused uplink occasions, the updated indication indicating that the at least one unused uplink occasion is to be used.

In a nineteenth aspect, alone or in combination with one or more of the first through eighteenth aspects, the updated indication is included in a communication that is multiplexed with the resources associated with the uplink occasion.

In a twentieth aspect, alone or in combination with one or more of the first through nineteenth aspects, transmitting the uplink communication using resources associated with the at least one unused uplink occasion is associated with a remaining packet delay budget of the uplink communication satisfying a threshold.

In a twenty-first aspect, alone or in combination with one or more of the first through twentieth aspects, the configuration information indicates that the one or more uplink occasions are associated with a first one or more values for one or more respective communication parameters, and the uplink communication is associated with a second one or more values for the one or more respective communication parameters.

In a twenty-second aspect, alone or in combination with one or more of the first through twenty-first aspects, the one or more respective communication parameters include at least one of a number of resources, a transmit power, a modulation and coding scheme, or a quantity of selectable resources from a set of resources.

In a twenty-third aspect, alone or in combination with one or more of the first through twenty-second aspects, the indication of the one or more unused uplink occasions is included in an uplink control information communication.

In a twenty-fourth aspect, alone or in combination with one or more of the first through twenty-third aspects, the one or more uplink occasions are configured grant occasions.

In a twenty-fifth aspect, alone or in combination with one or more of the first through twenty-fourth aspects, the configuration information indicates a configuration of a configured grant period, the one or more unused uplink occasions being associated with the configured grant period.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
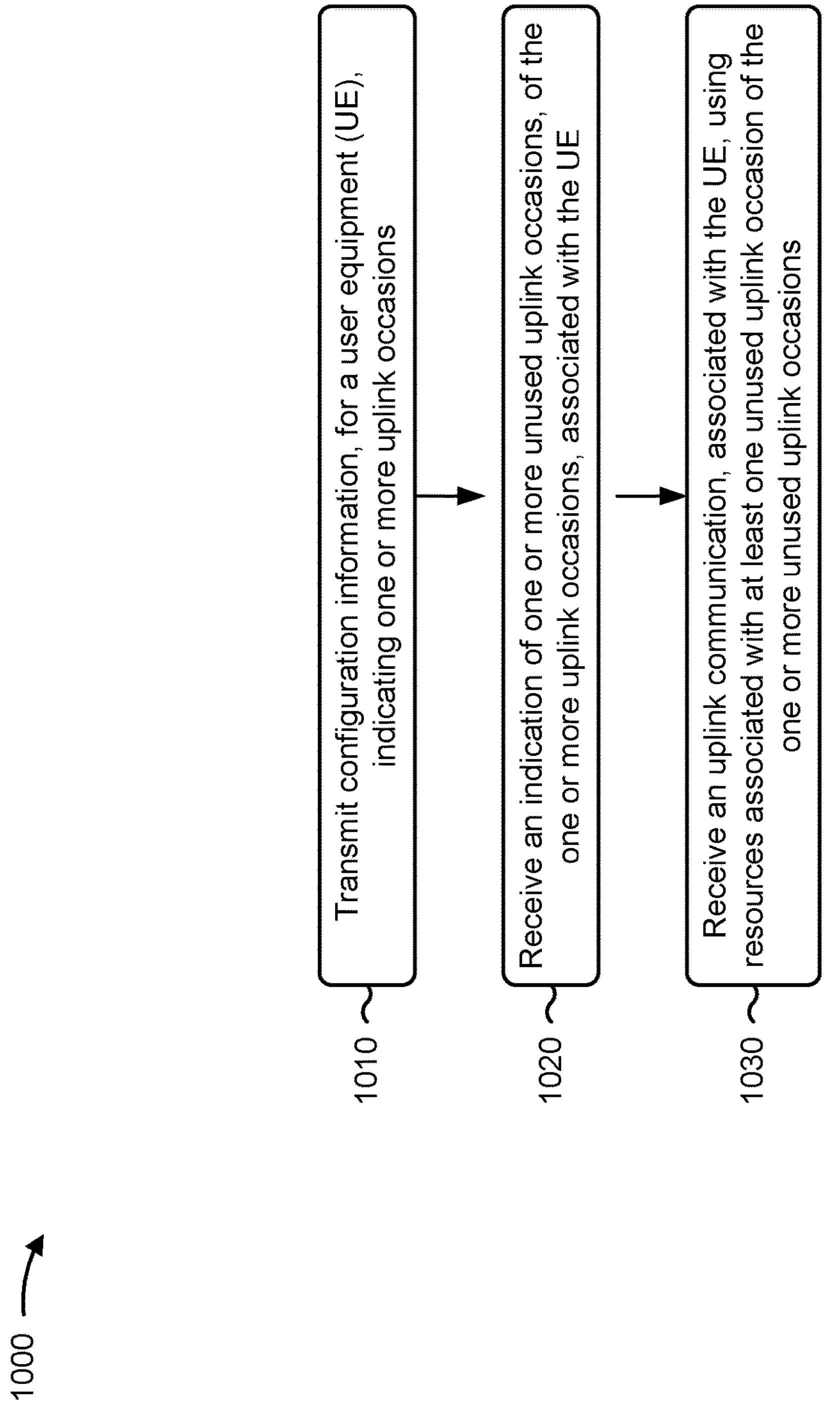
FIG. 10 is a diagram illustrating an example process performed, for example, by a network node, in accordance with the present disclosure.

FIG. 10 is a diagram illustrating an example process 1000 performed, for example, by a network node, in accordance with the present disclosure. Example process 1000 is an example where the network node (e.g., network node 110) performs operations associated with reclaiming unused uplink occasions.

As shown in FIG. 10, in some aspects, process 1000 may include transmitting configuration information, for a UE, indicating one or more uplink occasions (block 1010). For example, the network node (e.g., using transmission component 1204 and/or communication manager 1206, depicted in FIG. 12) may transmit configuration information, for a UE, indicating one or more uplink occasions, as described above.

As further shown in FIG. 10, in some aspects, process 1000 may include receiving an indication of one or more unused uplink occasions, of the one or more uplink occasions, associated with the UE (block 1020). For example, the network node (e.g., using reception component 1202 and/or communication manager 1206, depicted in FIG. 12) may receive an indication of one or more unused uplink occasions, of the one or more uplink occasions, associated with the UE, as described above.

As further shown in FIG. 10, in some aspects, process 1000 may include receiving an uplink communication, associated with the UE, using resources associated with at least one unused uplink occasion of the one or more unused uplink occasions (block 1030). For example, the network node (e.g., using reception component 1202 and/or communication manager 1206, depicted in FIG. 12) may receive an uplink communication, associated with the UE, using resources associated with at least one unused uplink occasion of the one or more unused uplink occasions, as described above.

Process 1000 may include additional aspects, such as any single aspect or any combination of aspects described below and/or in connection with one or more other processes described elsewhere herein.

In a first aspect, receiving the uplink communication using resources associated with the at least one unused uplink occasion is associated with one or more parameters of the uplink communication.

In a second aspect, alone or in combination with the first aspect, the one or more parameters include a logical channel group associated with the uplink communication.

In a third aspect, alone or in combination with one or more of the first and second aspects, the configuration information indicates whether uplink occasions, of the one or more uplink occasions, can be reclaimed, and receiving the uplink communication using resources associated with the at least one unused uplink occasion is associated with the configuration information indicating that the at least one unused uplink occasion can be reclaimed.

In a fourth aspect, alone or in combination with one or more of the first through third aspects, process 1000 includes transmitting an indication of whether the UE is permitted to transmit using uplink occasions that are indicated as unused uplink occasions.

In a fifth aspect, alone or in combination with one or more of the first through fourth aspects, receiving the uplink communication using resources associated with the at least one unused uplink occasion is associated with the UE being permitted to transmit using uplink occasions that are indicated as unused uplink occasions.

In a sixth aspect, alone or in combination with one or more of the first through fifth aspects, the indication of whether the UE is permitted to transmit using uplink occasions that are indicated as unused uplink occasions is communicated via radio resource control signaling.

In a seventh aspect, alone or in combination with one or more of the first through sixth aspects, the indication of whether the UE is permitted to transmit using uplink occasions that are indicated as unused uplink occasions is communicated via medium access control signaling.

In an eighth aspect, alone or in combination with one or more of the first through seventh aspects, the indication of whether the UE is permitted to transmit using uplink occasions that are indicated as unused uplink occasions is communicated via downlink control information signaling.

In a ninth aspect, alone or in combination with one or more of the first through eighth aspects, process 1000 includes receiving a communication indicating that the at least one unused uplink occasion is to be reclaimed.

In a tenth aspect, alone or in combination with one or more of the first through ninth aspects, receiving the uplink communication using resources associated with the at least one unused uplink occasion is associated with an amount of time from a first time at which the communication is received to a second time associated with the at least one unused uplink occasion satisfying a threshold.

In an eleventh aspect, alone or in combination with one or more of the first through tenth aspects, the threshold is associated with a processing capability of the UE.

In a twelfth aspect, alone or in combination with one or more of the first through eleventh aspects, receiving the uplink communication using resources associated with the at least one unused uplink occasion is associated with an amount of time from a first time at which the indication of the one or more unused uplink occasions is received to a second time at which the communication is received satisfying a threshold.

In a thirteenth aspect, alone or in combination with one or more of the first through twelfth aspects, the communication includes indications associated with respective uplink occasions, of the one or more uplink occasions, the indications indicating whether the respective uplink occasions are reclaimed.

In a fourteenth aspect, alone or in combination with one or more of the first through thirteenth aspects, the communication includes an indication that at least one of the one or more unused uplink occasions is to be reclaimed, and process 1000 includes receiving another communication that includes indications associated with respective uplink occasions, of the one or more uplink occasions, the indications indicating whether the respective uplink occasions are reclaimed.

In a fifteenth aspect, alone or in combination with one or more of the first through fourteenth aspects, the communication is transmitted via resources associated with an uplink occasion of the one or more uplink occasions.

In a sixteenth aspect, alone or in combination with one or more of the first through fifteenth aspects, the communication includes at least one of a scheduling request, uplink control information, a CSI report, a buffer status report, or a MAC control element communication.

In a seventeenth aspect, alone or in combination with one or more of the first through sixteenth aspects, a configuration associated with the communication indicates that the communication is associated with one or more logical channels, and receiving the uplink communication using resources associated with the at least one unused uplink occasion is associated with the uplink communication being associated with at least one of the one or more logical channels.

In an eighteenth aspect, alone or in combination with one or more of the first through seventeenth aspects, process 1000 includes receiving, via resources associated with an uplink occasion of the one or more uplink occasions, an updated indication of the one or more unused uplink occasions, the updated indication indicating that the at least one unused uplink occasion is to be used.

In a nineteenth aspect, alone or in combination with one or more of the first through eighteenth aspects, the updated indication is included in a communication that is multiplexed with the resources associated with the uplink occasion.

In a twentieth aspect, alone or in combination with one or more of the first through nineteenth aspects, receiving the uplink communication using resources associated with the at least one unused uplink occasion is associated with a remaining packet delay budget of the uplink communication satisfying a threshold.

In a twenty-first aspect, alone or in combination with one or more of the first through twentieth aspects, the configuration information indicates that the one or more uplink occasions are associated with a first one or more values for one or more respective communication parameters, and the uplink communication is associated with a second one or more values for the one or more respective communication parameters.

In a twenty-second aspect, alone or in combination with one or more of the first through twenty-first aspects, the one or more respective communication parameters include at least one of a number of resources, a transmit power, a modulation and coding scheme, or a quantity of selectable resources from a set of resources.

In a twenty-third aspect, alone or in combination with one or more of the first through twenty-second aspects, the indication of the one or more unused uplink occasions is included in an uplink control information communication.

In a twenty-fourth aspect, alone or in combination with one or more of the first through twenty-third aspects, the one or more uplink occasions are configured grant occasions.

In a twenty-fifth aspect, alone or in combination with one or more of the first through twenty-fourth aspects, the configuration information indicates a configuration of a configured grant period, the one or more unused uplink occasions being associated with the configured grant period.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
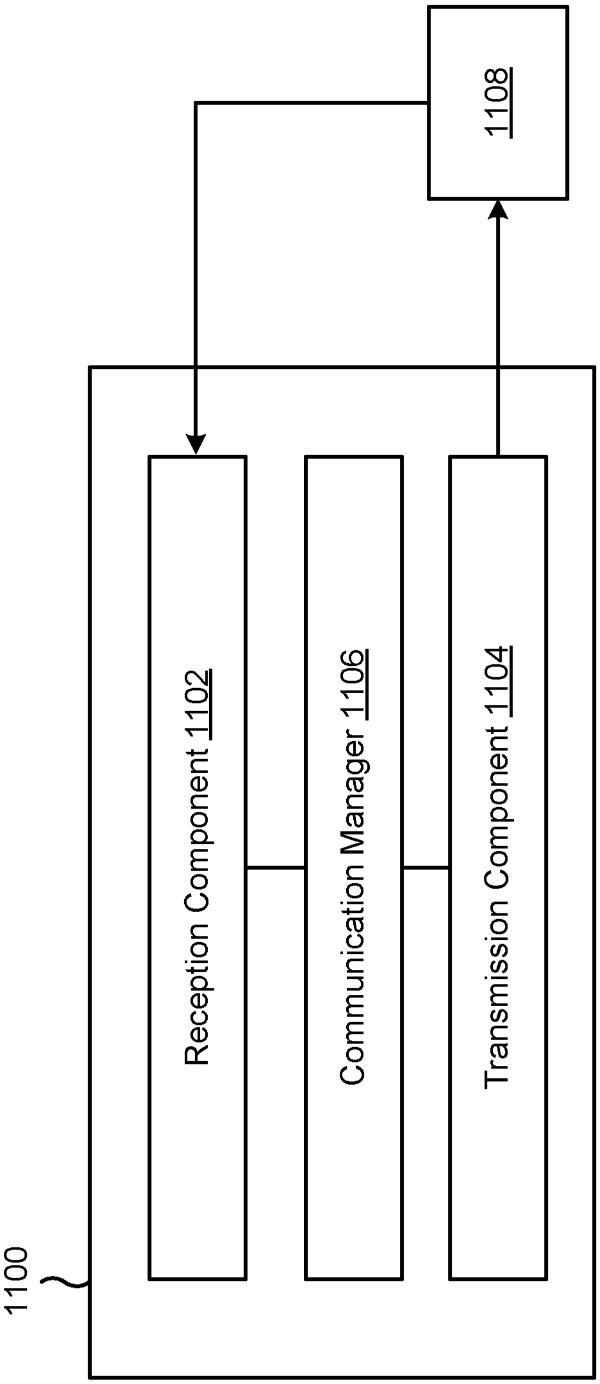
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 6-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive configuration information indicating one or more uplink occasions. The transmission component 1104 may transmit an indication of one or more unused uplink occasions of the one or more uplink occasions. The transmission component 1104 may transmit an uplink communication using resources associated with at least one unused uplink occasion of the one or more unused uplink occasions.

The reception component 1102 may receive an indication of whether the UE is permitted to transmit using uplink occasions that are indicated as unused uplink occasions.

The transmission component 1104 may transmit a communication indicating that the at least one unused uplink occasion is to be reclaimed.

The transmission component 1104 may transmit, via resources associated with an uplink occasion of the one or more uplink occasions, an updated indication of the one or more unused uplink occasions, the updated indication indicating that the at least one unused uplink occasion is to be used.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
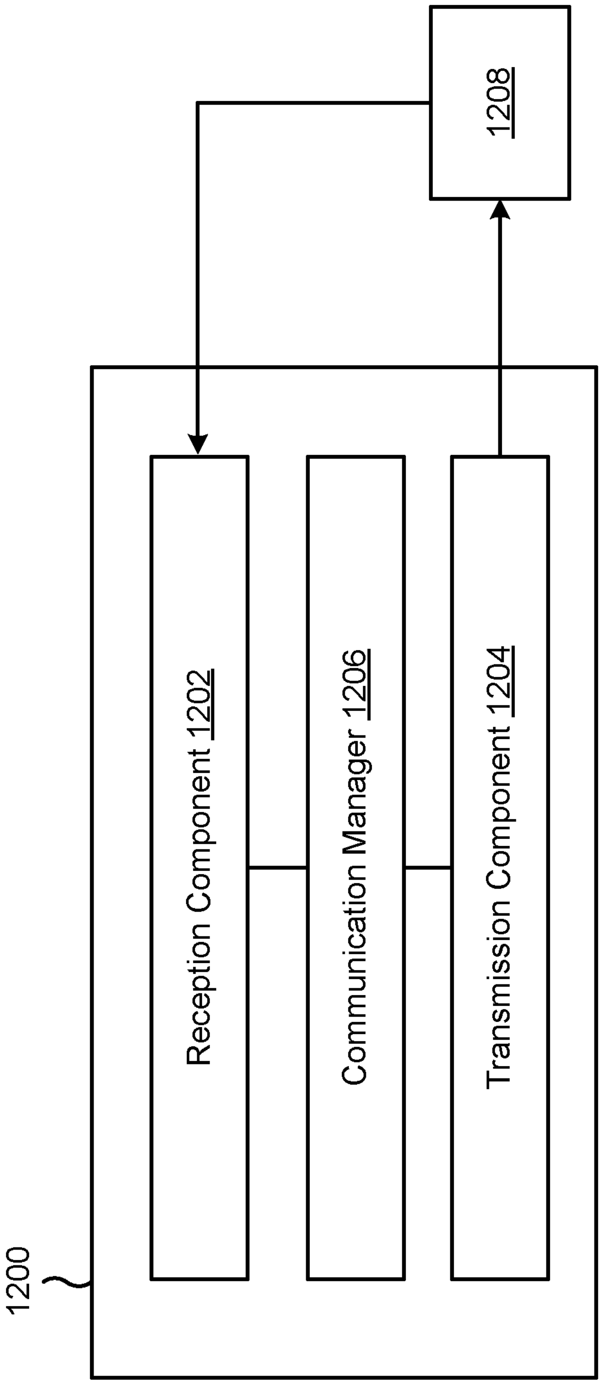
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 6-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2. In some aspects, the reception component 1202 and/or the transmission component 1204 may 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit configuration information, for a UE, indicating one or more uplink occasions. The reception component 1202 may 1202 may receive an indication of one or more unused uplink occasions, of the one or more uplink occasions, associated with the UE. The reception component 1202 may receive an uplink communication, associated with the UE, using resources associated with at least one unused uplink occasion of the one or more unused uplink occasions.

The transmission component 1204 may transmit an indication of whether the UE is permitted to transmit using uplink occasions that are indicated as unused uplink occasions.

The reception component 1202 may receive a communication indicating that the at least one unused uplink occasion is to be reclaimed.

The reception component 1202 may receive, via resources associated with an uplink occasion of the one or more uplink occasions, an updated indication of the one or more unused uplink occasions, the updated indication indicating that the at least one unused uplink occasion is to be used.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving configuration information indicating one or more uplink occasions; transmitting an indication of one or more unused uplink occasions of the one or more uplink occasions; and transmitting an uplink communication using resources associated with at least one unused uplink occasion of the one or more unused uplink occasions.

Aspect 2: The method of Aspect 1, wherein transmitting the uplink communication using resources associated with the at least one unused uplink occasion is associated with one or more parameters of the uplink communication.

Aspect 3: The method of Aspect 2, wherein the one or more parameters include a logical channel group associated with the uplink communication.

Aspect 4: The method of any of Aspects 1-3, wherein the configuration information indicates whether uplink occasions, of the one or more uplink occasions, can be reclaimed, and wherein transmitting the uplink communication using resources associated with the at least one unused uplink occasion is associated with the configuration information indicating that the at least one unused uplink occasion can be reclaimed.

Aspect 5: The method of any of Aspects 1-4, further comprising: receiving an indication of whether the UE is permitted to transmit using uplink occasions that are indicated as unused uplink occasions.

Aspect 6: The method of Aspect 5, wherein transmitting the uplink communication using resources associated with the at least one unused uplink occasion is associated with the UE being permitted to transmit using uplink occasions that are indicated as unused uplink occasions.

Aspect 7: The method of any of Aspects 5-6, wherein the indication of whether the UE is permitted to transmit using uplink occasions that are indicated as unused uplink occasions is communicated via radio resource control signaling.

Aspect 8: The method of any of Aspects 5-7, wherein the indication of whether the UE is permitted to transmit using uplink occasions that are indicated as unused uplink occasions is communicated via medium access control signaling.

Aspect 9: The method of any of Aspects 5-8, wherein the indication of whether the UE is permitted to transmit using uplink occasions that are indicated as unused uplink occasions is communicated via downlink control information signaling.

Aspect 10: The method of any of Aspects 1-9, further comprising: transmitting a communication indicating that the at least one unused uplink occasion is to be reclaimed.

Aspect 11: The method of Aspect 10, wherein transmitting the uplink communication using resources associated with the at least one unused uplink occasion is associated with an amount of time from a first time at which the communication is transmitted to a second time associated with the at least one unused uplink occasion satisfying a threshold.

Aspect 12: The method of Aspect 11, wherein the threshold is associated with a processing capability of the UE.

Aspect 13: The method of any of Aspects 10-12, wherein transmitting the uplink communication using resources associated with the at least one unused uplink occasion is associated with an amount of time from a first time at which the indication of the one or more unused uplink occasions is transmitted to a second time at which the communication is transmitted satisfying a threshold.

Aspect 14: The method of any of Aspects 10-13, wherein the communication includes indications associated with respective uplink occasions, of the one or more uplink occasions, the indications indicating whether the respective uplink occasions are reclaimed.

Aspect 15: The method of any of Aspects 10-14, wherein the communication includes an indication that at least one of the one or more unused uplink occasions is to be reclaimed, the method further comprising: transmitting another communication that includes indications associated with respective uplink occasions, of the one or more uplink occasions, the indications indicating whether the respective uplink occasions are reclaimed.

Aspect 16: The method of any of Aspects 10-15, wherein the communication is transmitted via resources associated with an uplink occasion of the one or more uplink occasions.

Aspect 17: The method of any of Aspects 10-16, wherein the communication includes at least one of: a scheduling request, uplink control information, a channel state information (CSI) report, a buffer status report, or a medium access control (MAC) control element communication.

Aspect 18: The method of any of Aspects 10-17, wherein a configuration associated with the communication indicates that the communication is associated with one or more logical channels, and wherein transmitting the uplink communication using resources associated with the at least one unused uplink occasion is associated with the uplink communication being associated with at least one of the one or more logical channels.

Aspect 19: The method of any of Aspects 1-18, further comprising: transmitting, via resources associated with an uplink occasion of the one or more uplink occasions, an updated indication of the one or more unused uplink occasions, the updated indication indicating that the at least one unused uplink occasion is to be used.

Aspect 20: The method of Aspect 19, wherein the updated indication is included in a communication that is multiplexed with the resources associated with the uplink occasion.

Aspect 21: The method of any of Aspects 1-20, wherein transmitting the uplink communication using resources associated with the at least one unused uplink occasion is associated with a remaining packet delay budget of the uplink communication satisfying a threshold.

Aspect 22: The method of any of Aspects 1-21, wherein the configuration information indicates that the one or more uplink occasions are associated with a first one or more values for one or more respective communication parameters, and wherein the uplink communication is associated with a second one or more values for the one or more respective communication parameters.

Aspect 23: The method of Aspect 22, wherein the one or more respective communication parameters include at least one of: a number of resources, a transmit power, a modulation and coding scheme, or a quantity of selectable resources from a set of resources.

Aspect 24: The method of any of Aspects 1-23, wherein the indication of the one or more unused uplink occasions is included in an uplink control information communication.

Aspect 25: The method of any of Aspects 1-24, wherein the one or more uplink occasions are configured grant occasions.

Aspect 26: The method of any of Aspects 1-25, wherein the configuration information indicates a configuration of a configured grant period, the one or more unused uplink occasions being associated with the configured grant period.

Aspect 27: A method of wireless communication performed by a network node, comprising: transmitting configuration information, for a user equipment (UE), indicating one or more uplink occasions; receiving an indication of one or more unused uplink occasions, of the one or more uplink occasions, associated with the UE; and receiving an uplink communication, associated with the UE, using resources associated with at least one unused uplink occasion of the one or more unused uplink occasions.

Aspect 28: The method of Aspect 27, wherein receiving the uplink communication using resources associated with the at least one unused uplink occasion is associated with one or more parameters of the uplink communication.

Aspect 29: The method of Aspect 28, wherein the one or more parameters include a logical channel group associated with the uplink communication.

Aspect 30: The method of any of Aspects 27-29, wherein the configuration information indicates whether uplink occasions, of the one or more uplink occasions, can be reclaimed, and wherein receiving the uplink communication using resources associated with the at least one unused uplink occasion is associated with the configuration information indicating that the at least one unused uplink occasion can be reclaimed.

Aspect 31: The method of any of Aspects 27-30, further comprising: transmitting an indication of whether the UE is permitted to transmit using uplink occasions that are indicated as unused uplink occasions.

Aspect 32: The method of Aspect 31, wherein receiving the uplink communication using resources associated with the at least one unused uplink occasion is associated with the UE being permitted to transmit using uplink occasions that are indicated as unused uplink occasions.

Aspect 33: The method of any of Aspects 31-32, wherein the indication of whether the UE is permitted to transmit using uplink occasions that are indicated as unused uplink occasions is communicated via radio resource control signaling.

Aspect 34: The method of any of Aspects 31-33, wherein the indication of whether the UE is permitted to transmit using uplink occasions that are indicated as unused uplink occasions is communicated via medium access control signaling.

Aspect 35: The method of any of Aspects 31-34, wherein the indication of whether the UE is permitted to transmit using uplink occasions that are indicated as unused uplink occasions is communicated via downlink control information signaling.

Aspect 36: The method of any of Aspects 27-35, further comprising: receiving a communication indicating that the at least one unused uplink occasion is to be reclaimed.

Aspect 37: The method of Aspect 36, wherein receiving the uplink communication using resources associated with the at least one unused uplink occasion is associated with an amount of time from a first time at which the communication is received to a second time associated with the at least one unused uplink occasion satisfying a threshold.

Aspect 38: The method of Aspect 37, wherein the threshold is associated with a processing capability of the UE.

Aspect 39: The method of any of Aspects 36-38, wherein receiving the uplink communication using resources associated with the at least one unused uplink occasion is associated with an amount of time from a first time at which the indication of the one or more unused uplink occasions is received to a second time at which the communication is received satisfying a threshold.

Aspect 40: The method of any of Aspects 36-39, wherein the communication includes indications associated with respective uplink occasions, of the one or more uplink occasions, the indications indicating whether the respective uplink occasions are reclaimed.

Aspect 41: The method of any of Aspects 36-40, wherein the communication includes an indication that at least one of the one or more unused uplink occasions is to be reclaimed, the method further comprising: receiving another communication that includes indications associated with respective uplink occasions, of the one or more uplink occasions, the indications indicating whether the respective uplink occasions are reclaimed.

Aspect 42: The method of any of Aspects 36-41, wherein the communication is transmitted via resources associated with an uplink occasion of the one or more uplink occasions.

Aspect 43: The method of any of Aspects 36-42, wherein the communication includes at least one of: a scheduling request, uplink control information, a channel state information (CSI) report, a buffer status report, or a medium access control (MAC) control element communication.

Aspect 44: The method of any of Aspects 36-43, wherein a configuration associated with the communication indicates that the communication is associated with one or more logical channels, and wherein receiving the uplink communication using resources associated with the at least one unused uplink occasion is associated with the uplink communication being associated with at least one of the one or more logical channels.

Aspect 45: The method of any of Aspects 27-44, further comprising: receiving, via resources associated with an uplink occasion of the one or more uplink occasions, an updated indication of the one or more unused uplink occasions, the updated indication indicating that the at least one unused uplink occasion is to be used.

Aspect 46: The method of Aspect 45, wherein the updated indication is included in a communication that is multiplexed with the resources associated with the uplink occasion.

Aspect 47: The method of any of Aspects 27-46, wherein receiving the uplink communication using resources associated with the at least one unused uplink occasion is associated with a remaining packet delay budget of the uplink communication satisfying a threshold.

Aspect 48: The method of any of Aspects 27-47, wherein the configuration information indicates that the one or more uplink occasions are associated with a first one or more values for one or more respective communication parameters, and wherein the uplink communication is associated with a second one or more values for the one or more respective communication parameters.

Aspect 49: The method of Aspect 48, wherein the one or more respective communication parameters include at least one of: a number of resources, a transmit power, a modulation and coding scheme, or a quantity of selectable resources from a set of resources.

Aspect 50: The method of any of Aspects 27-49, wherein the indication of the one or more unused uplink occasions is included in an uplink control information communication.

Aspect 51: The method of any of Aspects 27-50, wherein the one or more uplink occasions are configured grant occasions.

Aspect 52: The method of any of Aspects 27-51, wherein the configuration information indicates a configuration of a configured grant period, the one or more unused uplink occasions being associated with the configured grant period.

Aspect 53: An apparatus for wireless communication at a device, comprising a processor; memory coupled with the processor; and instructions stored in the memory and executable by the processor to cause the apparatus to perform the method of one or more of Aspects 1-26.

Aspect 54: A device for wireless communication, comprising one or more memories and one or more processors coupled to the one or more memories, the one or more processors configured to perform the method of one or more of Aspects 1-26.

Aspect 55: An apparatus for wireless communication, comprising at least one means for performing the method of one or more of Aspects 1-26.

Aspect 56: A non-transitory computer-readable medium storing code for wireless communication, the code comprising instructions executable by a processor to perform the method of one or more of Aspects 1-26.

Aspect 57: A non-transitory computer-readable medium storing a set of instructions for wireless communication, the set of instructions comprising one or more instructions that, when executed by one or more processors of a device, cause the device to perform the method of one or more of Aspects 1-26.

Aspect 58: An apparatus for wireless communication at a device, comprising a processor; memory coupled with the processor; and instructions stored in the memory and executable by the processor to cause the apparatus to perform the method of one or more of Aspects 27-52.

Aspect 59: A device for wireless communication, comprising one or more memories and one or more processors coupled to the one or more memories, the one or more processors configured to perform the method of one or more of Aspects 27-52.

Aspect 60: An apparatus for wireless communication, comprising at least one means for performing the method of one or more of Aspects 27-52.

Aspect 61: A non-transitory computer-readable medium storing code for wireless communication, the code comprising instructions executable by a processor to perform the method of one or more of Aspects 27-52.

Aspect 62: A non-transitory computer-readable medium storing a set of instructions for wireless communication, the set of instructions comprising one or more instructions that, when executed by one or more processors of a device, cause the device to perform the method of one or more of Aspects 27-52.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
- one or more memories; and
- one or more processors, coupled to the one or more memories, configured to:
  - receive configuration information indicating one or more uplink occasions;
  - transmit an indication of one or more unused uplink occasions of the one or more uplink occasions; and
  - transmit, subsequent to the indication, an uplink communication that reclaims at least one unused uplink occasion of the one or more unused uplink occasions by use of resources allocated for the at least one unused uplink occasion.

2. The UE of claim 1, wherein the configuration information indicates whether uplink occasions, of the one or more uplink occasions, can be reclaimed, and
- wherein transmitting the uplink communication is associated with the configuration information indicating that the at least one unused uplink occasion can be reclaimed.

3. The UE of claim 1, wherein the one or more processors are further configured to:
- receive an indication of whether the UE is permitted to transmit using uplink occasions that are indicated as unused uplink occasions.

4. The UE of claim 3, wherein transmitting the uplink communication is associated with the UE being permitted to transmit using uplink occasions that are indicated as unused uplink occasions.

5. The UE of claim 1, wherein the one or more processors are further configured to:
- transmit a communication indicating that the at least one unused uplink occasion is to be reclaimed.

6. The UE of claim 5, wherein transmitting the uplink communication is associated with an amount of time from a first time at which the communication is transmitted to a second time associated with the at least one unused uplink occasion satisfying a threshold.

7. The UE of claim 5, wherein transmitting the uplink communication is associated with an amount of time from a first time at which the indication of the one or more unused uplink occasions is transmitted to a second time at which the communication is transmitted satisfying a threshold.

8. The UE of claim 5, wherein the communication includes an indication that at least one of the one or more unused uplink occasions is to be reclaimed, and wherein the one or more processors are further configured to:
- transmit another communication that includes indications associated with respective uplink occasions, of the one or more uplink occasions, the indications indicating whether the respective uplink occasions are reclaimed.

9. The UE of claim 5, wherein the communication is transmitted via resources associated with an uplink occasion of the one or more uplink occasions.

10. The UE of claim 5, wherein the communication includes a scheduling request.

11. The UE of claim 1, wherein the one or more processors are further configured to:
- transmit, via resources associated with an uplink occasion of the one or more uplink occasions, an updated indication of the one or more unused uplink occasions, the updated indication indicating that the at least one unused uplink occasion is to be used.

12. The UE of claim 1, wherein transmitting the uplink communication is associated with a remaining packet delay budget of the uplink communication satisfying a threshold.

13. The UE of claim 1, wherein the configuration information indicates that the one or more uplink occasions are associated with a first one or more values for one or more respective communication parameters, and wherein the uplink communication is associated with a second one or more values for the one or more respective communication parameters.

14. The UE of claim 1, wherein the one or more uplink occasions are configured grant occasions.

15. A network node for wireless communication, comprising:
- one or more memories; and
- one or more processors, coupled to the one or more memories, configured to:
  - transmit configuration information, for a user equipment (UE), indicating one or more uplink occasions;

receive an indication of one or more unused uplink occasions, of the one or more uplink occasions, associated with the UE; and receive, subsequent to the indication, an uplink communication, associated with the UE, that reclaims at least one unused uplink occasion of the one or more unused uplink occasions by use of resources allocated for the at least one unused uplink occasion.

16. The network node of claim 15, wherein receiving the uplink communication is associated with one or more parameters of the uplink communication.

17. The network node of claim 15, wherein the one or more processors are further configured to:

transmit an indication of whether the UE is permitted to transmit using uplink occasions that are indicated as unused uplink occasions.

18. The network node of claim 17, wherein receiving the uplink communication is associated with the UE being permitted to transmit using uplink occasions that are indicated as unused uplink occasions.

19. The network node of claim 15, wherein the one or more processors are further configured to:

receive a communication indicating that the at least one unused uplink occasion is to be reclaimed.

20. The network node of claim 15, wherein the one or more processors are further configured to:

receive, via resources associated with an uplink occasion of the one or more uplink occasions, an updated indication of the one or more unused uplink occasions, the updated indication indicating that the at least one unused uplink occasion is to be used.

21. A method of wireless communication performed by a user equipment (UE), comprising:

receiving configuration information indicating one or more uplink occasions;

transmitting an indication of one or more unused uplink occasions of the one or more uplink occasions; and transmitting, subsequent to the indication, an uplink communication that reclaims at least one unused uplink occasion of the one or more unused uplink occasions by use of resources allocated for the at least one unused uplink occasion.

22. The method of claim 21, wherein transmitting the uplink communication is associated with one or more parameters of the uplink communication.

23. The method of claim 22, wherein the one or more parameters include a logical channel group associated with the uplink communication.

24. The method of claim 21, further comprising:

transmitting a communication indicating that the at least one unused uplink occasion is to be reclaimed.

25. The method of claim 24, wherein the communication includes indications associated with respective uplink occasions, of the one or more uplink occasions, the indications indicating whether the respective uplink occasions are reclaimed.

26. The method of claim 24, wherein the communication includes at least one of:

uplink control information, a channel state information (CSI) report, a buffer status report, or a medium access control (MAC) control element communication.

27. The method of claim 21, wherein the configuration information indicates a configuration of a configured grant period, the one or more unused uplink occasions being associated with the configured grant period.

28. A method of wireless communication performed by a network node, comprising:

transmitting configuration information, for a user equipment (UE), indicating one or more uplink occasions;

receiving an indication of one or more unused uplink occasions, of the one or more uplink occasions, associated with the UE; and receiving, subsequent to the indication, an uplink communication, associated with the UE, that reclaims at least one unused uplink occasion of the one or more unused uplink occasions by use of resources allocated for the at least one unused uplink occasion.

29. The method of claim 28, further comprising:

receiving a communication indicating that the at least one unused uplink occasion is to be reclaimed.

30. The method of claim 28, wherein receiving the uplink communication is associated with a logical channel associated with the uplink communication being included in an allowed logical channel group for reclaiming unused uplink occasions.

* * * * *